United States Patent
Chen et al.

(10) Patent No.: US 11,711,851 B2
(45) Date of Patent: Jul. 25, 2023

(54) TWO-STEP RANDOM ACCESS PROCEDURE IN NEXT GENERATION WIRELESS NETWORKS

(71) Applicant: FG Innovation Company Limited, Tuen Mun (CN)

(72) Inventors: Hung-Chen Chen, Hsinchu (TW);
Chie-Ming Chou, Hsinchu (TW);
Mei-Ju Shih, Hsinchu (TW);
Chia-Hung Wei, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/669,253

(22) Filed: Oct. 30, 2019

(65) Prior Publication Data

US 2020/0146069 A1  May 7, 2020

Related U.S. Application Data

(60) Provisional application No. 62/754,589, filed on Nov. 2, 2018.

(51) Int. Cl.
| | |
|---|---|
| *H04W 74/08* | (2009.01) |
| *H04B 17/318* | (2015.01) |
| *H04L 5/00* | (2006.01) |
| *H04W 76/27* | (2018.01) |
| *H04L 1/1867* | (2023.01) |

(Continued)

(52) U.S. Cl.
CPC ...... *H04W 74/0833* (2013.01); *H04B 17/318* (2015.01); *H04L 1/189* (2013.01); *H04L 5/0051* (2013.01); *H04W 76/11* (2018.02); *H04W 76/27* (2018.02); *H04W 80/02* (2013.01)

(58) Field of Classification Search
CPC ........... H04W 74/0833; H04W 74/006; H04W 76/11; H04W 76/27; H04W 76/18; H04W 80/02; H04W 48/12; H04W 52/362; H04W 52/50; H04B 17/318; H04B 17/327; H04L 1/189; H04L 5/0051
See application file for complete search history.

(56) References Cited

U.S. PATENT DOCUMENTS

| | | | |
|---|---|---|---|
| 10,848,287 B2 * | 11/2020 | Jung | H04L 5/0007 |
| 2018/0103465 A1 * | 4/2018 | Agiwal | H04W 74/004 |

(Continued)

FOREIGN PATENT DOCUMENTS

| | | |
|---|---|---|
| CN | 108064050 A | 5/2018 |
| CN | 108207027 A | 6/2018 |

OTHER PUBLICATIONS

R2-1700358, ASUSTek, "Consideration on fallback of 2-step RACH procedure", Jan. 2017 (Year: 2017).*

(Continued)

*Primary Examiner* — Ricardo H Castaneyra
(74) *Attorney, Agent, or Firm* — ScienBiziP, P.C.

(57) ABSTRACT

Some of the present implementations provide a method for a user equipment (UE) for performing a random access (RA) procedure. The method receives, at the UE, an RA configuration and a reference signal received power (RSRP) threshold. The method then determines whether a detected RSRP exceeds the RSRP threshold once the RA procedure is initiated. If the detected RSRP exceeds the RSRP threshold, the method performs a two-step RA procedure.

14 Claims, 13 Drawing Sheets

(51) Int. Cl.
*H04W 76/11* (2018.01)
*H04W 80/02* (2009.01)

(56) References Cited

U.S. PATENT DOCUMENTS

| | | | | |
|---|---|---|---|---|
| 2018/0110074 | A1* | 4/2018 | Akkarakaran | H04W 72/0413 |
| 2018/0279375 | A1* | 9/2018 | Jeon | H04W 74/0833 |
| 2018/0279376 | A1* | 9/2018 | Dinan | H04W 74/0833 |
| 2019/0335515 | A1* | 10/2019 | Chen | H04W 76/18 |
| 2020/0100297 | A1* | 3/2020 | Agiwal | H04W 74/0833 |
| 2020/0107369 | A1* | 4/2020 | Jeon | H04W 74/0833 |
| 2020/0404711 | A1* | 12/2020 | Zhao | H04W 28/0278 |
| 2021/0243814 | A1* | 8/2021 | Zhang | H04W 74/0833 |

OTHER PUBLICATIONS

R2-168465, InterDigital Communications, "Random Access Procedure in NR", Nov. 2016. (Year: 2016).*
Huawei et al., 3GPP TSG-RAN2 Meeting #102, R2-1808467, Discussion on random access for NR-U, May 25, 2018 (May 25, 2018), the whole document.
Asustek,Consideration on fallback of 2-step RACH procedure,R2-1700358,3GPP TSG-RAN WG2 Meeting #NR Ad Hoc Spokane, USA, Jan. 17-19, 2017; pp. 1-4; FIGs. 1-3.
LTE,Evolved Universal Terrestrial Radio Access(E-UTRA),Medium Access Control (MAC) protocol specification,3GPP TS 36.321 version 15.3.0 Release 15; Oct. 17, 2018; pp. 19-30.
OPPO,Two-steps RACH procedure for NR-U, R2-1811067,3GPP TSG-RAN WG2 Meeting #103, Gothenberg, Sweden, Aug. 20, 2018-Aug. 24, 2018; pp. 1-3.
3GPP TS 38.213, "3rd Generation Partnership Project; Technical Specification Group Radio Access Network; NR; Physical layer procedures for control (Release 15)", V15.3.0 (Sep. 2018).
3GPP TS 38.214, "3rd Generation Partnership Project; Technical Specification Group Radio Access Network; NR; Physical layer procedures for data (Release 15)", V15.3.0 (Sep. 2018).
3GPP TS 38.300, "3rd Generation Partnership Project; Technical Specification Group Radio Access Network; NR; NR and NG-RAN Overall Description; Stage 2 (Release 15)", V15.3.1 (Oct. 2018).
3GPP TS 38.321, "3rd Generation Partnership Project; Technical Specification Group Radio Access Network; NR; Medium Access Control (MAC) protocol specification (Release 15)", V15.3.0 (Sep. 2018).
3GPP TS 38.331, "3rd Generation Partnership Project; Technical Specification Group Radio Access Network; NR; Radio Resource Control (RRC) protocol specification (Release 15)", V15.3.0 (Sep. 2018).

* cited by examiner

TWO-STEP RANDOM ACCESS PROCEDURE IN NEXT GENERATION WIRELESS NETWORKS

CROSS-REFERENCE TO RELATED APPLICATION(S)

The present application claims the benefit of and priority to a provisional U.S. Patent Application Ser. No. 62/754,589, filed on Nov. 2, 2018, entitled "2-step RA Procedure in NR-U," with (hereinafter referred to as "US75370 application"). The disclosure of the US75370 application is hereby incorporated fully by reference into the present application.

FIELD

The present disclosure generally relates to wireless communications, and more particularly, to performing a two-step random access (RA) procedure in the next generation wireless networks.

BACKGROUND

Listen Before Talk (LBT) is a mechanism used by a network connected device for determining whether a shared channel is available for radio transmissions (e.g., using Clear Channel Assessment (CCA)). In an LBT procedure, a transmitter must sense the channel before transmitting. If the transmitter determines that the channel is occupied, the LBT procedure fails and the transmission is suppressed. Some of the wireless networks, such as a Wi-Fi network, may leverage the LBT feature to allow the coexistence of multiple users (e.g., multiple nodes may share the same radio channel using the LBT feature). The 3rd Generation Partnership Project (3GPP) uses a similar LBT scheme when leveraging an unlicensed band (e.g., 5 GHz) in combination with a licensed spectrum (e.g., to boost the performance of a user equipment). For example, the License Assisted Access (LAA) scheme uses carrier aggregation (e.g., in downlink) to combine the Long Term Evolution (LTE) in an unlicensed spectrum with the LTE in the licensed spectrum.

In New Radio (NR), an LBT mechanism may also be required prior to radio transmissions (e.g., when operating in an unlicensed spectrum). Using an LBT mechanism in NR, however, may significantly increase the overall time for completing a 4-step contention-based Random Access (RA) procedure, because, for example, every one of the message transmissions in the RA procedure should pass an LBT procedure first. Additionally, the RA procedure failure rate may increase even more if the selected (unlicensed) channel, or operating bandwidth, is busy (considering the fact that the NR-U operating bandwidth may reach multiples of 20 MHz). Therefore, there is a need in the industry for an enhanced and efficient RA procedure for the next generation wireless networks.

SUMMARY

The present disclosure is directed to performing a two-step RA procedure in the next generation wireless networks.

In a first aspect of the present application, a method for a UE for preforming an RA procedure is provided. The method comprises receiving, at the UE, an RA configuration and a reference signal received power (RSRP) threshold; determining whether a detected RSRP exceeds the RSRP threshold once the RA procedure is initiated; and performing a two-step RA procedure after determining that the detected RSRP exceeds the RSRP threshold.

An implementation of the first aspect further comprises determining that the two-step RA procedure is not successful after transmitting a first message associated with a first step of the two-step RA procedure repeatedly for a specific number of times; and switching to a four-step RA procedure.

In another implementation of the first aspect, the two-step RA procedure comprises transmitting a first message to a base station in a first step and receiving a second message from the base station in a second step.

In another implementation of the first aspect, the first message comprises a preamble and a payload, and the second message comprises at least one response including at least one of contention resolution information and fallback information.

In another implementation of the first aspect, the second message comprises a media access control (MAC) sub-header of a MAC sub-Protocol Data Unit (subPDU) that indicates whether the at least one response contains the contention resolution information for indicating a successful two-step RA procedure or the fallback information for transmitting a third message to the base station.

Another implementation of the first aspect further comprises determining that the second message reception is not successful; and retransmitting the first message to the base station.

In another implementation of the first aspect, the second message reception is not successful when an RA response time window expires, but a response that either includes contention resolution information associated with the first message, or includes fallback information associated with the first message for transmitting a third message to the base station is not received.

In another implementation of the first aspect, retransmitting the first message comprises: determining whether a threshold number of retransmissions has been reached; and retransmitting the first message to the base station after determining that the threshold number of retransmissions has not been reached.

Another implementation of the first aspect further comprises determining whether fallback information associated with the first message is included in the second message; and transmitting a third message to the base station after determining that the fallback information is included in the second message.

In another implementation of the first aspect, transmitting the third message comprises transmitting the third message to the base station using an uplink grant indicated in the fallback information of the second message received from the base station.

In a second aspect of the present application, a UE comprising one or more non-transitory computer-readable media having computer-executable instructions; and at least one processor is provided. The processor is coupled to the one or more non-transitory computer-readable media, and configured to execute the computer-executable instructions to: receive, at the UE, an RA configuration and a reference signal received power (RSRP) threshold; determine whether a detected RSRP exceeds the RSRP threshold once the RA procedure is initiated; and perform a two-step RA procedure after determining that the detected RSRP exceeds the RSRP threshold.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
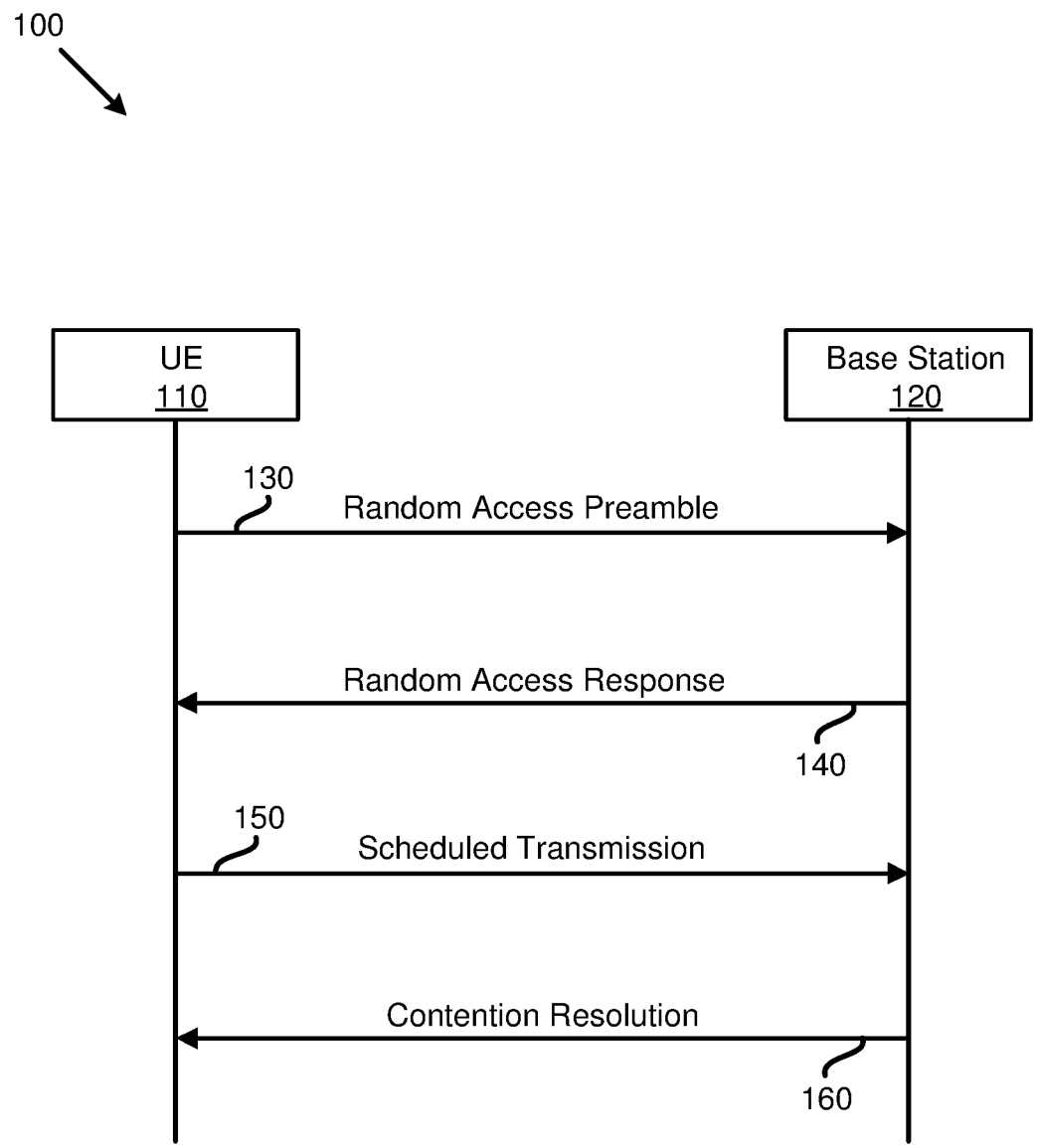
FIG. 1 is a diagram illustrating a normal contention-based RA procedure, according to one example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station may communicate with one or more UEs in the radio communication system through the plurality of cells. A cell may allocate sidelink (SL) resources for supporting Proximity Service (ProSe) or Vehicle to Everything (V2X) services. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaptation may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

A UE (e.g., that is capable of operating on an unlicensed spectrum in an NR network) may perform a normal 4-step RA procedure or an enhanced 4-step RA procedure (e.g., with multiple transmission opportunities in frequency domain or time domain) to connect to a cell (e.g., that operates on an unlicensed spectrum/frequency/channel).

As described above, using the Listen Before Talk (LBT) feature in the NR may significantly increase the overall time for completing a 4-step Contention-Based Random Access (CBRA) procedure, since every message transmission in the RA procedure may have to pass the LBT test (e.g., a Clear Channel Assessment (CCA) has to be performed and passed before each message transmission of the RA procedure). To shorten the required time for completing a CBRA procedure and also to increase the RA success rate, some of the present implementations provide a 2-step CBRA procedure (instead of the normal, or enhanced, 4-step CBRA procedure), which may shorten the time required to complete the RA procedure, and which is additionally beneficial in a case that the RA procedure includes one or more LBT procedures (because of having less impact by the LBT procedure). In some of the present implementations, a UE may complete the CBRA procedure in two steps, which may include sending a first message (e.g., a MsgA) to a serving cell (or base station) and receiving a second message (e.g., a MsgB) from the serving cell (or base station).

In some of the present implementations, the first message (i.e., the MsgA) may include the same type of information that a Msg3 includes in a 4-step RA procedure, while the second message (i.e., MsgB) is for contention resolution. Since the reception of the payload associated with the first message may fail, in order to shorten a delay caused by the preamble(s) (or MsgA) retransmission, some of the present implementations may provide a fallback mechanism. That is, in some of such implementations, the UE may fall back from the 2-step RA procedure to a particular type of 4-step RA procedure, in which the UE may transmit a Msg3 to the base station when the second message (or MsgB) includes the response with the fallback information associated with the first message (e.g., RA preamble identifier of the response for the fallback information matches the transmitted preamble index of the first message). In some of the present implementations, if the MsgB reception from the base station fails and the UE determines that a threshold number in sending the MsgA to the base station has been reached, the UE may give up performing the 2-step RA procedure and switch back to performing a 4-step RA procedure. That is, in some of the present implementations, the UE may switch from transmitting the MsgA to transmitting a Msg1 (of the 4-step procedure) (e.g., by performing a 4-step RA resource selection) within the same RA procedure.

FIG. 1 is a diagram 100 illustrating a normal contention-based RA procedure, according to one example implementation of the present application. FIG. 1 includes a UE 110, and a base station (e.g., a gNB) 120. As shown in the figure, the 4-step contention-based random access procedure may start by the UE 110 sending, in action 130, a Random Access Preamble (Msg1) to the base station 120. The UE 110 may send the RA preamble to the base station 120 on a Physical Random Access Channel (PRACH) in the uplink. In response, in action 140, the base station 120 may send a Random Access Response (RAR) (Msg2) to the UE 110. The RAR may be generated by a Medium Access Control (MAC) entity and transmitted on a Downlink Shared Channel (DL-SCH). The RAR, transmitted in action 140 may include an RA-preamble identifier, Timing Alignment information for the primary Timing Advanced Group (pTAG), initial UL grant, and assignment of Temporary Cell-Radio Network Temporary Identity (C-RNTI).

After receiving the RAR, the UE 110 may send, in action 150, a first scheduled UL transmission (Msg3), for example, on an Uplink Shared Channel (UL-SCH) to the base station 120. After the base station 120 receives the first scheduled UL transmission, the base station may send, in action 160, a Contention Resolution message (Msg4) to the UE 110 on the DL.

In an RA procedure, upon receiving a RAR or Msg2 (e.g., in action 140), if the RAR contains a MAC sub-Protocol Data Unit (subPDU) with an RA preamble identifier that is associated with the transmitted preamble (e.g., when the identifier matches the preamble's index), the RAR reception may be considered as successful. That is, a RAR, which is a MAC PDU, may include one or more MAC subPDUs. A MAC subPDU may have a subheader part and a payload part. In some of the present implementations, the MAC subheader in the RAR may include an RA preamble identifier (e.g., RAPID) that is associated with the RA preamble index. That is, the RA preamble identifier may match the preamble index associated with the preamble for the UE to determine that the received RAR is associated with the sent preamble.

After the UE determines that the RAR reception is successful, the MAC layer (e.g., in the UE) may indicate the received UL grant to the lower layers to transmit the Msg3 (e.g., in action 150). Once the Msg3 is transmitted, the MAC entity may start a timer (e.g., the ra-ContentionResolutionTimer) and restart the timer (e.g., the ra-ContentionResolutionTimer) at each Hybrid Automatic Repeat reQuest (HARQ) retransmission (e.g., in the first symbol after the end of the Msg3 transmission). An RA procedure may be considered as successfully completed when the contention-resolution is successfully performed (e.g., when the UE Contention Resolution identity in the MAC Control Element (CE) matches the Common Control Channel (CCCH) Service Data Unit (SDU) transmitted in the Msg3, or other conditions defined in the 3GPP technical specification (e.g., TS 38.321) are met). However, if the timer (e.g., the ra-ContentionResolutionTimer) expires, the Contention-Resolution may be considered not successful if none of the successfully completed conditions (e.g., matching of the UE identifiers, or other conditions defined in the 3GPP TS 38.321) is satisfied. The content of the 3GPP TS 38.321 is hereby incorporated by reference in its entirety.

Instead of, or in conjunction with, a normal 4-step RA procedure or an enhanced 4-step CBRA procedure, some of the present implementations may provide a 2-step CBRA procedure.

Figure 2:
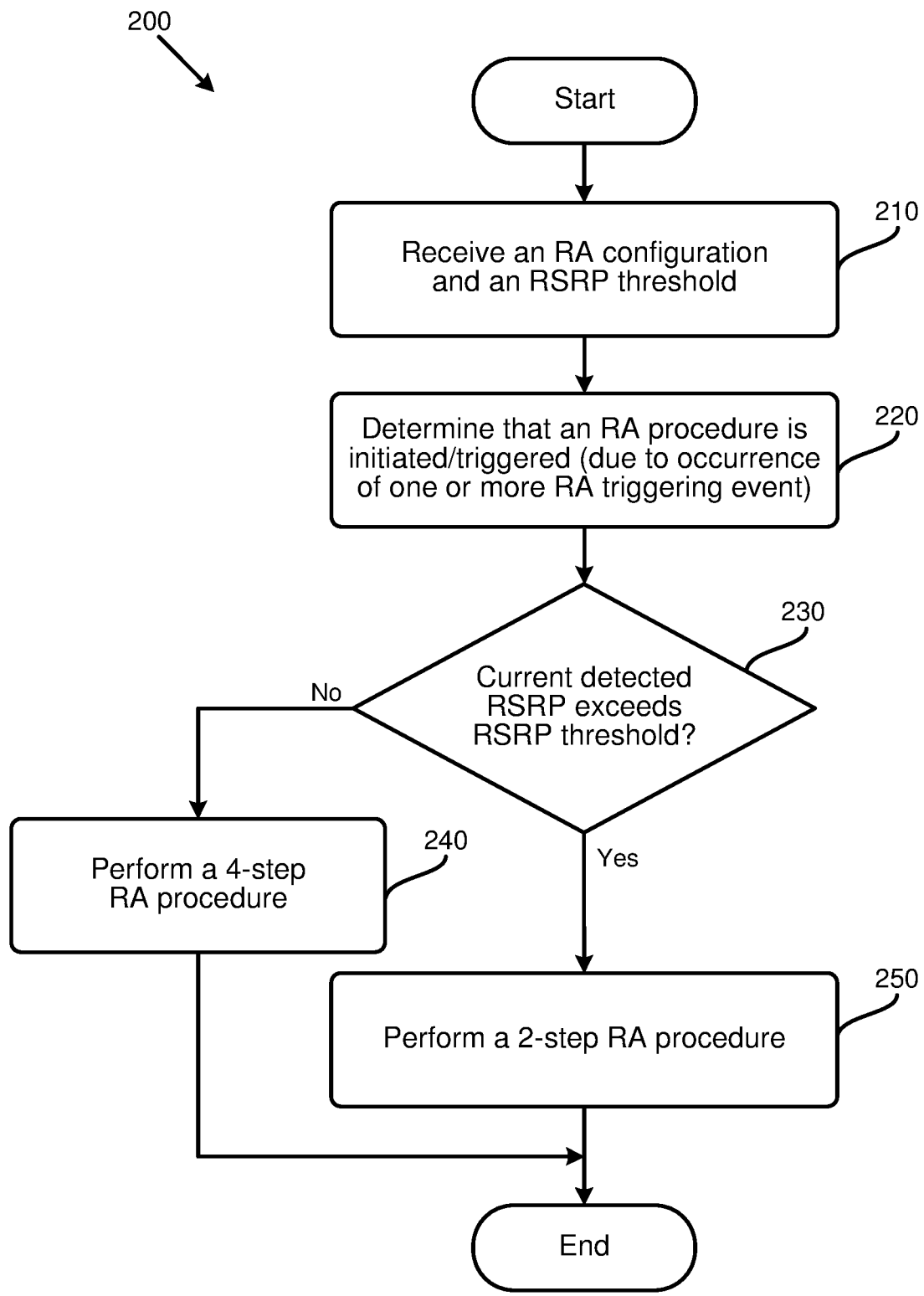
FIG. 2 is a flowchart illustrating a method (or process) performed by a UE to determine whether to perform a 4-step RA procedure or a 2-step RA procedure, according to an example implementation of the present application.

FIG. 2 is a flowchart illustrating a method (or process) 200 performed by a UE to determine whether to perform a 4-step RA procedure or a 2-step RA procedure, according to an example implementation of the present application. The process 200 may start in action 210 by receiving an RA configuration and a reference signal received power (RSRP) threshold value. In some of the present implementations, the RSRP threshold may be received as part of the RA configuration (e.g., in the broadcasting system information), while in other implementations, the RSRP threshold may be received separately (e.g., in RRC signaling or in the broadcasting system information).

In action 220, the process 200 may determine that an RA procedure is initiated/triggered (e.g., due to occurrence of one or more RA triggering events). The RA triggering events, in some of the present implementations, as described below, may include, but are not limited to, an initial access from an RRC_IDLE state, an RRC connection reestablishment procedure, a handover procedure, a DL or UL data arrival during an RRC_Connected state when the UL synchronization status is "non-synchronized," a UL data arrival during an RRC_Connected state when there are no PUCCH resources available for a scheduling request (SR), an SR failure, a transition from the RRC_Inactive state, to establish time alignment at an SCell addition, to request for other SIs, a beam failure recovery, etc.

After the RA procedure is initiated/triggered, in some of the present implementations, the process 200 may determine, in action 230, whether the (current) detected RSRP value exceeds (or is above) the received RSRP threshold value. For example, the (current) detected RSRP may be the RSRP of the downlink pathloss reference. In some of the present implementations, the UE may detect the current value of the RSRP after receiving the triggering event. In some other aspects of the present implementations, the UE may detect the RSRP value at certain (or preconfigured) intervals. In some of such implementations, the UE may compare the received RSRP threshold value with the most recently detected RSRP value after the RA procedure is initiated/triggered or the RA triggering event occurred. In some other aspects of the present implementations, as described in more detail below, the process may use other thresholds, instead of, or in conjunction with, the RSRP threshold.

When the process 200 determines that the detected RSRP value is not greater than (or equal to) the received RSRP threshold value, the process may perform, in action 240, a normal, or enhanced, 4-step RA procedure. The process 200 may then end. On the other hand, if the process 200 determines that the current detected RSRP value is greater than (or is above) the received RSRP threshold value, the process may perform, in action 250, a 2-step RA procedure (e.g., as described in more detail below with reference to FIG. 3). The process 200 may then end.

In some of the present implementations, a UE may receive the configuration for the 2-step RA procedure from a base station as part of a general RA configuration (e.g., the UE may receive the 2-step and 4-step RA configuration together as one RA configuration). In some other aspects of the present implementations, the UE may receive the 2-step RA configuration separately (i.e., not as part of a general RA configuration). In some of such implementations, the UE may not be allowed to perform the 2-step RA procedure when no 2-step RA configuration is received. In some of the present implementations, the UE may negotiate its capability with regard to the 2-step RA procedure with the base station first (e.g., during an RRC establishment procedure). In some of the present implementations, only after the base station determines that the UE is capable of performing the procedure, the UE may receive the 2-step RA configuration from the base station.

In some of the present implementations, a cell (or a corresponding base station/node) may broadcast (e.g., in the system information (SI)) the parameters (of the RA configuration) for a 2-step RA procedure and the parameters for a 4-step RA procedure separately. In some aspects of the present implementations, these RA configuration parameters may be broadcast to all of the UEs through one or more SI blocks (SIBs), or may be transmitted to a UE (e.g., in an RRC_Connected, Inactive, or Idle state) through dedicated control signaling. The RA configuration parameters may include, but are not limited to a a preambleTransMax, and/or an ra-Response Window.

A PREAMBLE_TRANSMISSION_COUNTER, which is a UE variable, may be used to count the number of preamble transmissions. The preambleTransMax may be a maximum number of RA preamble transmissions performed before declaring an RA procedure failure. The preambleTransMax of a 2-step RA procedure (e.g., msgATransMax) may be a maximum number of MsgA transmissions performed before switching to transmitting Msg1 in the same RA procedure. The ra-Response Window may be a window length to monitor MsgB in number of time units (e.g., slots, symbols, or milliseconds). If no parameters for a 2-step RA procedure is broadcast/provided by a cell, some of the present implementations may determine that the 2-step RA procedure is not allowed to be performed on the cell (or the associated base station/node). Similarly, in some of the present implementations, if no parameters for a 4-step RA procedure is broadcast/provided by a cell, the UE may be determined not to be allowed to perform a 4-step RA procedure on the cell (or the associated base station/node).

As will be discussed in more detail below, in some of the present implementations, when a 2-step RA procedure fails and the UE determines that fallback information is included in the second message received from the base station, the UE may switch back to a 4-step RA procedure. In some of such implementations, however, when the 4-step RA procedure is prohibited (e.g., no configuration parameters is received from the base station), a fallback procedure to switch from the 2-step RA procedure to the 4-step RA procedure may not be allowed. In some of the present implementations, a cell (or the associated base station/node) may broadcast an indicator, or related information, in the system information to indicate whether a fallback mechanism to switch from the 2-step RA procedure to the 4-step RA procedure is allowed.

As described above, in some of the present implementations, a cell (or the associated base station/node) may broadcast an indicator (e.g., in the SI) to indicate whether the 2-step RA procedure is supported by the cell or not. Whether to include such an indicator, in some of the present implementations, may be optional. That is, if the indicator is present, the cell may support the 2-step RA procedure, and if the indicator is absent, the cell may not support the 2-step RA procedure. In some other aspects of the present implementations, the value of the indicator may show whether the cell supports the 2-step RA procedure. For example, when the indicator (e.g., transmitted in MIB, SIB1, or other SIs) is a Boolean, having a value of '1' may show that the cell supports the 2-step RA procedure, while having a value of '0' may indicate that the cell does not support the 2-step RA procedure. In some of such implementations, when the indicator is absent, the UE may release the related configuration parameters for 2-step RA procedure received from the cell.

An RA procedure, in some of the present implementations, may be initiated/triggered by one or more RA triggering events including, but not limited to, an initial access from an RRC_IDLE state, an RRC connection reestablishment procedure, a handover procedure, a DL or UL data arrival during an RRC_Connected state when the UL synchronization status is "non-synchronized," a UL data arrival during an RRC_Connected state when there are no PUCCH resources available for a scheduling request (SR), an SR failure, a transition from the RRC_Inactive state, to establish time alignment at an SCell addition, to request for other SIs, a beam failure recovery, etc.

As described above, in some of the present implementations, a cell (or the associated base station/node) may broadcast a fallback indicator or related information (e.g., in the system information) to indicate whether a fallback mechanism from a 2-step RA procedure to a 4-step RA procedure is allowed for certain RRC procedures (e.g., for an RRC resume procedure or an RRC re-establishment procedure) or for certain triggering events of an RA procedure (e.g., for the event of transitioning from an Inactive state or for the a handover event). The fallback indicator may be transmitted to the UE to switch to a 4-step RA procedure in case the 2-step RA procedure is determined to be unsuccessful.

In some of the present implementations, in case the 2-step RA procedure is successful, a successRAR (in MsgB) (or a response including the contention resolution information)

may include, but is not limited to, a contention resolution ID, a C-RNTI, and a TA command. In some of the present implementations, a fallbackRAR (or a response including the fallback information) may include, but is not limited to, a RAPID, one or more UL grants (e.g., in order to retransmit the MsgA payload using the UL grant(s)), a Temporary C-RNTI, and a TA command.

In some of the present implementations, the fallback indicator (or fallback information) may be included in the second message (or MsgB) of the 2-step RA procedure to indicate whether a fallback mechanism from the 2-step RA procedure to the 4-step RA procedure is allowed for this round of preamble transmission. If the UE receives a fallback indication (or fallback information) in the MsgB, in response to a MsgA transmitted by the UE, the UE may then transmit a Msg3 using the UL grant received in the MsgB (e.g., as part of a response associated with the fallback information). If the UE does not receive a fallback indication in the MsgB, the UE may retransmit the MsgA.

In some of the present implementations, the network (NW) may indicate which RRC procedure(s) or RA procedure triggering events (or conditions) may trigger a UE to perform a fallback mechanism from the 2-step RA procedure to the 4-step RA procedure. In some of the present implementations, the RRC procedure(s) or RA procedure triggering events (or conditions), for which the UE is allowed to perform a fallback mechanism from the 2-step RA procedure to the 4-step RA procedure, may be predefined. In some of the present implementations, a UE may only be allowed to perform a fallback mechanism from the 2-step RA procedure to the 4-step RA procedure if a 4-step RA procedure is supported by the NW.

In some of the present implementations, a cell (e.g., operating on an unlicensed spectrum in NR) may broadcast the common (e.g., ssb-perRACH-OccasionAndCB-PreamblesPerSSB) parameters for both 2-step RA procedure and 4-step RA procedure. In some of the present implementations, the NW may provide particular information (e.g., the fallback information or the fallback RAR-related information) in the MsgB to indicate to a UE to perform a fallback mechanism from a 2-step RA procedure to a 4-step RA procedure. In some of the present implementations, based on a unified access class (UAC) classification, only a UE with some specific AC may be allowed to perform a fallback mechanism. More specifically, the allowed AC may be indicated to the UE via the SI, or may be predefined for the UE. For example, the triggering events of a 2-step RA procedure corresponding to a specific AC (e.g., AC 'x', where x is a number) may need to be defined for the UE.

In a 2-step RA procedure of some of the present implementations, a UE variable (e.g., the PREAMBLE_TRANSMISSION_COUNTER) may be used to count the number of the preamble transmissions. If the PREAMBLE_TRANSMISSION_COUNTER=preambleTransMax+1, the MAC layer may indicate an RA problem to the upper layers in some of the present implementations. The variable preambleTransMax may be configurable to indicate the maximum number of RA preamble transmissions performed before declaring a failure. In some of the present implementations, if the MAC layer indicates an RA problem in a 2-step RA procedure to the upper layer(s), the UE (or its upper layer(s)) may be allowed to perform a 4-step RA procedure on the same cell under some specific conditions (e.g., based on the service types, traffic types, UE categories, etc.).

For example, if a 2-step RA procedure is initiated by a certain URLLC service, but later failed, the UE may select another cell to perform the 2-step RA procedure (if allowed) and may not perform a 4-step RA procedure on the same serving cell. As another example, if a 2-step RA procedure is initiated by a certain URLLC service, but later failed, the UE may select another cell on a licensed spectrum to perform the RA procedure and may not perform the 4-step RA procedure on the same cell. As yet, another example, if a 2-step RA procedure is initiated by a certain eMBB service, but later failed, the UE may perform a 4-step RA procedure on the same cell. In some of the present implementations, the conditions that define whether a 4-step RA procedure could be performed on the same cell after a 2-step RA procedure has failed may be predefined for the UE or may be broadcast to the UE, for example, in the system information. In some of the present implementations, the MAC layer may indicate (e.g., to upper layer(s)) whether an RA problem is related to a 2-step RA procedure or a 4-step RA procedure. In some of the present implementations, the MAC layer may also indicate (to the upper layers) whether the RA problem is related to an unlicensed spectrum or a licensed spectrum.

In some of the present implementations, the first message (or MsgA) of a 2-step RA procedure may include two separate signals (e.g., a preamble and a payload). The preamble signal may be transmitted on a physical random access channel (PRACH), and the payload signal may be transmitted on physical uplink shared channel (PUSCH) to the base station in some of the present implementations. The preamble signal, as described above, may be associated with a preamble index which is used by the UE to determine whether a received RAR is associated with the sent preamble. The payload signal may include, but is not limited to, the information of UE ID, RRC messages, or some other MAC control elements (CEs) in some of the present implementations.

In some of the present implementations, based on an indication broadcast by the cell, a UE that performs a 2-step RA procedure may forgo transmitting a preamble to the base station and only transmit the payload. In some of such implementations, if there are no parameters of 2-step RA procedure related to the preamble transmission (e.g., PRACH configuration or PRACH configuration index), the UE may perform the 2-step RA procedure by only transmitting the payload signal.

In some of the present implementations, two or more RA preamble groups (e.g., an RA preamble group A and an RA preamble group B) may be configured to the UE for a 2-step RA procedure. In some of such implementations, if the potential payload size of the MsgA transmitted by the UE is greater than the predefined payload size of the RA preamble group A, the UE may select the RA preamble group B for asking for a larger payload size. In some of the present implementations, if the potential payload size of the MsgA transmitted by the UE is greater than the predefined payload size of the RA preamble group A and the pathloss is less than a preconfigured threshold, the UE may select the RA preamble group B for requesting a larger payload size.

In some of the present implementations, the NW may broadcast different RACH resources (e.g., in the frequency domain, in the time domain, or in the code domain) or different RA parameters for different types of 2-step RA procedures, including a 2-step RA procedure with the preamble in the MsgA only, a 2-step RA procedure with the payload in the MsgA only, or a 2-step RA procedure with both preamble and payload in the MsgA. In some of the present implementations, a cell (e.g., that operates on an unlicensed spectrum in NR) may broadcast the information or data that indicate the relationship (or association) between the PRACH preambles (or resources) and the PUSCH resources for performing a 2-step RA procedure. In some of the present implementations, based on the size of the payload, a UE may determine which RRC procedure(s), or RA procedure, triggering events (or conditions) are allowed to trigger the UE to perform a 2-step RA procedure.

For example, if the size of the payload is not enough to accommodate the information required for an RRC Resume procedure, or an RRC re-establishment procedure, the UE may perform a 4-step RA procedure for the RRC Resume procedure, or the RRC re-establishment procedure. In some of the present implementations, based on a set of predefined rules, a UE may know which RRC procedure(s) or RA procedure triggering events (or conditions) are allowed to trigger the UE to perform a 2-step RA procedure.

In some of the present implementations, based on a pathloss condition, the UE may determine which RRC procedure(s) or RA procedure triggering events (or conditions) are allowed to trigger the UE to perform the 2-step RA procedure. If the UE determines that its pathloss is below or equal to the pathloss threshold received from the cell, the UE may perform a 2-step RA procedure for certain or all RRC procedure(s) or RA procedure triggering events (or conditions). Conversely, if the UE determines that its pathloss is above the pathloss threshold, the UE may not perform the 2-step RA procedure for certain or all RRC procedure(s) or RA procedure triggering events (or conditions).

In some of the present implementations, in an initiated 2-step RA procedure, if a UE determines that its (detected) pathloss is below or equal to the pathloss threshold and the contention resolution is not determined to be successful, the UE may not perform a fallback mechanism (e.g., from the 2-step RA procedure to the 4-step RA procedure), but may retransmit the MsgA. On the other hand, if the UE determines that its pathloss is above the pathloss threshold, and the contention resolution is not determined to be successful, the UE may perform a fallback mechanism (e.g., the UE may transmit a Msg3 containing the payload of the MsgA to the base station). It should be noted that the pathloss threshold may not be the only threshold used for considering a 2-step RA procedure. For example, in some of the present implementations, an RSRP threshold, a Received Signal Strength Indicator (RSSI) threshold, a Channel Busy Ratio (CBR) threshold, a pathloss threshold, etc., may be equally applicable (i.e., may be used for determining whether to perform a 2-step RA procedure or a 4-step RA procedure). For example, a cell (e.g., which operates on an unlicensed spectrum in NR) may broadcast an RSRP threshold to the UE. The broadcast RSRP, in some of the present implementations, may be the RSRP of the DL pathloss reference. In some of the present implementations, based on the RSRP threshold, the UE may determine whether to perform a 2-step RA procedure when an RA procedure is initiated/triggered, or an RA triggering event occurs. If the UE determines that its RSRP is above the (2-step RA) RSRP threshold, the UE may perform a 2-step RA procedure for certain or all RRC procedure(s) or RA procedure triggering events (or conditions). Conversely, if the UE determines that its RSRP is below or equal to the RSRP threshold, the UE may not perform the 2-step RA procedure for certain or all RRC procedure(s) or RA procedure triggering events (or conditions).

In some of the present implementations, in an initiated 2-step RA procedure, if a UE determines that its RSRP is above the RSRP threshold and the contention resolution is not considered to be successful, the UE may not perform a fallback mechanism (e.g., from the 2-step RA procedure to the 4-step RA procedure), but may retransmit the MsgA. Conversely, if the UE determines that its RSRP is below or equal to the RSRP threshold, and the contention resolution is not considered to be successful, the UE may perform a fallback mechanism (e.g., may transmit a Msg3 to the base station after receiving the MsgB).

For example, a cell (or the associated base station/node) may broadcast a CBR threshold to the UE. If the UE determines that its CBR is above or equal to the CBR threshold, the UE may perform a 2-step RA procedure for certain or all RRC procedure(s) or RA procedure triggering events (or conditions). Conversely, if the UE determines that its CBR is below the CBR threshold, the UE may not perform 2-step RA procedure for certain or all RRC procedure(s) or RA procedure triggering events (or conditions).

In some of the present implementations, in an initiated 2-step RA procedure, there may be a 2-step threshold (e.g., msgATransMax) for a 2-step preamble transmission counter. A UE may first try to transmit the MsgA without a fallback mechanism. If the 2-step preamble transmission counter is greater than (or equal to) the 2-step threshold, the UE may start a random access resource selection and transmit the Msg1 of a 4-step RA procedure. In some of the present implementations, in an initiated 2-step RA procedure, there may be a 2-step timer. A UE may first try to transmit the MsgA without a fallback mechanism. If the 2-step timer expires and the 2-step RA procedure is not considered as successful, the UE may start a random access resource selection and transmit the Msg1 of the 4-step RA procedure to the base station.

For contention resolution in a contention-based RA procedure, the MsgA may include a UE's specific ID for retrieving the contention resolution ID. In some of the present implementations, different RRC procedures or RA triggering events may involve different UE specific IDs for contention resolution. For example, for a UE in a Connected state, or for an RRC re-establishment procedure, or a related RA triggering event, an entire or part of the UE specific RNTI (e.g., a Cell-Radio Network Temporary Identity (C-RNTI), a Configured Scheduling RNTI (CS-RNTI) or a Modulation Coding Scheme Cell RNTI (MCS-C-RNTI) assigned to the UE) may be used for contention resolution. The size of the UE's specific RNTI may be 16 bits in some of the present implementations.

For an RRC re-establishment procedure, or a related RA triggering event, a UE may only be allowed to perform a 2-step RA procedure if the cell selected by a cell selection procedure is the same as the PCell the UE was connected to prior to the failure. In this case, the information related to the Physical Cell Identity of the PCell to which the UE was connected prior to the failure and the shortMAC-I (which is used to identify and verify the UE at the RRC connection re-establishment) may not be required to be included in the MsgA in some of the present implementations. In some of the present implementations, if the cell selected by a cell selection procedure is not the same as the PCell to which the UE was connected prior to the failure, the UE may need to perform a 4-step RA procedure (e.g., if the payload for the MsgA does not accommodate all of the information required for the RRC re-establishment procedure).

For an RRC setup procedure, or a related RA triggering event, the rightmost 39 bits of the 5G-S-TMSI, or 39 bits random value may be included in MsgA payload for contention resolution. In some of the present implementations, for a 4-step RA procedure, a UE may include the rightmost 39 bits of the 5G-S-TMSI or 39 bits random value in the MsgA for an RRC Setup Request. For a 2-step RA procedure, the UE may include the rightmost N1 bits (N being an integer greater than zero and less than 39) of the 5G-S-TMSI or N1 bits random value in the MsgA for an RRC Setup Request. The value of N1 may be predefined (e.g., defined as 16 or 24 bits) in some implementations, or may be broadcast in the system information in other implementations. In some of the present implementations, the value of N1 may be configurable.

For an RRC resume procedure, or a related RA triggering event, a short I-RNTI (which is 24 bits) or a full I-RNTI (which is 40 bits) may be used in MsgA payload for contention resolution. Both short I-RNTI and full I-RNTI may be used to identify the suspended UE context of an Inactive UE. In some of the present implementations, whether a short I-RNTI or a full I-RNTI is used for an RRC resume procedure may be based on the information signalled in the system information (e.g., SIB1). In some of the present implementations, only a short I-RNTI may be allowed to be included in a MsgA for an RRC Resume procedure. In some of the present implementations, for the RRC Resume procedure, or a related RA triggering event, a UE may be only allowed to perform a 2-step RA procedure if the cell selected in a cell reselection procedure is the same as the PCell to which the UE was connected prior to transitioning to the Inactive state. In this case, the information of resumeMAC-I (which is used to identify and verify the UE at the RRC connection resume) may not be required to be included in the MsgA. If the cell selected by a cell reselection procedure is not the same as the PCell to which the UE was connected prior to transitioning to the Inactive state, the UE may need to perform a 4-step RA procedure (e.g., if the payload of a MsgA does not accommodate all of the information required for an RRC resume procedure).

A UL-CCCH-Message class, which is one of the current two UL CCCH messages, is a set of 48-bit RRC messages that may be sent from the UE to the Network on the uplink CCCH logical channel. The UL-CCCH1-Message class, which is the other UL CCCH message, is a set of 64-bit RRC messages that may be sent from the UE to the Network on the uplink CCCH1 logical channel. Some of the present implementations may provide a new UL CCCH message which is a set of N2-bit RRC message that may be sent from the UE to the Network on the uplink CCCH logical channel in the MsgA's payload part in 2-step RA procedure. N2 may be an integer with a value less than 48. N2 may be a configurable value broadcast in the system information or may be a predefined value in some of the present implementations.

Some of the present implementations may provide a unified payload information structure for different RRC procedures, or RA trigging events. For example, in the payload of some of the present implementations, the size of a UE's specific ID for different RRC procedures or RA trigging events may be the same (e.g., 16 bits or 24 bits). For example, the UE may include 16 bits UE specific RNTI (e.g., C-RNTI, CS-RNTI, or MCS-RNTI) for an RRC re-establishment procedure or a related RA triggering event, and may include the rightmost 16 bits of the 5G-S-TMSI or 16 bits random value for an RRC setup procedure or a related RA triggering event. The UE may also include the rightmost 16 bits of a full I-RNTI or the rightmost 16 bits of a short I-RNTI for an RRC resume procedure or a related RA triggering event.

In some of the present implementations, to support a 2-step RA procedure, the NW may provide a mini I-RNTI to a UE in an RRC Release message with suspend configuration. If a UE moves out of its RAN notification Area (RNA), which is configured in an RRC Release message with suspend configuration, the UE may trigger an RRC resume procedure to inform the NW. If the 2-step RA procedure is allowed in the new serving base station, the UE may include part of a full I-RNTI, part of a short I-NRTI, the full I-RNTI, the short I-RNTI, or the mini I-RNTI, in the MsgA for a contention resolution. For example, the UE may include 16 bits UE specific RNTI (e.g., C-RNTI, CS-RNTI or MCS-RNTI) for an RRC re-establishment procedure or related RA triggering event, may include the rightmost 16 bits of the 5G-S-TMSI or 16 bits random value for an RRC setup procedure, or a related RA triggering event, and/or may include a mini I-RNTI for an RRC resume procedure or a related RA triggering event.

In some of the present implementations, the payload signals may include a bit, or other information, to indicate whether the payload is used or not. For example, in case of a request for Other SI, Beam failure recovery, or DL/UL data arrival during RRC_CONNECTED when UL synchronization status is "non-synchronized", a UE may transmit the information in the payload signal to indicate that the payload part is not used.

In a 2-step RA procedure of some of the present implementations, once a MsgA is transmitted, the UE (e.g., the MAC entity of the UE) may start a response time window (e.g., a MsgB ra-ResponseWindow) to receive a corresponding MsgB. In some of the present implementations, if the ra-ResponseWindow expires, but no MsgB containing an RA preamble identifier that matches the transmitted preamble (based on the preamble index) is received, the RAR reception (or MsgB reception) may be considered as unsuccessful. In some of the present implementations, if the ra-ResponseWindow expires, but no MsgB containing a contention resolution ID that matches the contention resolution ID transmitted in the MsgA (e.g., first 48 bits in CCCH SDU transmitted in MsgA) is received, the RAR reception (or MsgB reception) is considered to be unsuccessful.

In some of the present implementations, if the ra-ResponseWindow expires, but no PDCCH transmission could be addressed by the UE's contention resolution ID, or UE's specific RNTI included in the MsgA, the RAR reception (or MsgB reception) may be considered as unsuccessful. In some of the present implementations, if the MsgB reception is considered as not successful, the UE may increase a preamble transmission counter (e.g., the PREAMBLE_TRANSMISSION_COUNTER) by one and may retransmit the MsgA. If the transmission counter reaches a threshold number, the UE may stop performing the 2-step RA procedure and switch back to a normal (or enhanced) 4-step RA procedure.

In some of the present implementations, the UE may transmit a Msg3 (e.g., for re-sending the content in MsgA payload) using the UL grant received in the MsgB in order to perform a fallback mechanism from a 2-step RA procedure to a 4-step RA procedure, based on a response for fallback indication associated with the sent MsgA, or based on other information (successfully) received in the MsgB (e.g., when Temporary C-RNTI is included, or when Contention Resolution ID is not included). Once, the Msg 3 is transmitted, the UE (e.g., the MAC entity) may start a timer (e.g., the ra-ContentionResolutionTimer), and restart the ra-ContentionResolutionTimer at each HARQ retransmission in the first symbol after the end of the Msg3 transmission. A 4-step RA procedure is considered to be successful when the contention resolution is done (e.g., the Contention Resolution ID in the MAC CE matches the CCCH SDU transmitted in the Msg3, or when other conditions defined in the technical specification of the 3GPP are fulfilled). In some of the present implementations, if the timer ra-Contention-ResolutionTimer expires, the Contention Resolution is considered as not being successful if none of the success cases described above has occurred.

In some of the present implementations, a preamble transmission counter may increase by one if the MsgB reception is considered as unsuccessful and no Msg3 is transmitted (i.e., no fallback mechanism is performed). If a fallback mechanism from the 2-step RA procedure to the 4-step RA procedure is performed (e.g., a Msg3 is transmitted due to the MsgB reception's failure), the preamble transmission counter may increase by one when a contention resolution fails (e.g., based on a Msg4 reception). In some of the present implementations, the preamble power ramping counter (e.g., PREAMBLE_POWER_RAMPING_COUNTER) may increase by one when a notification of a suspending power ramp counter has not been received from the lower layers and the selected RS (e.g., SSB or CRI-RS) is not changed.

In some of the present implementations, if a 2-step RA procedure is initiated, the parameters related to the 2-step RA procedure (e.g., a preamble power ramping step (PREAMBLE_POWER_RAMPING_STEP), the initial RA preamble (preambleReceivedTargetPower), etc.) may be applicable to both of the 2-step RA procedure and the fallback to the 4-step RA procedure.

Figure 3:
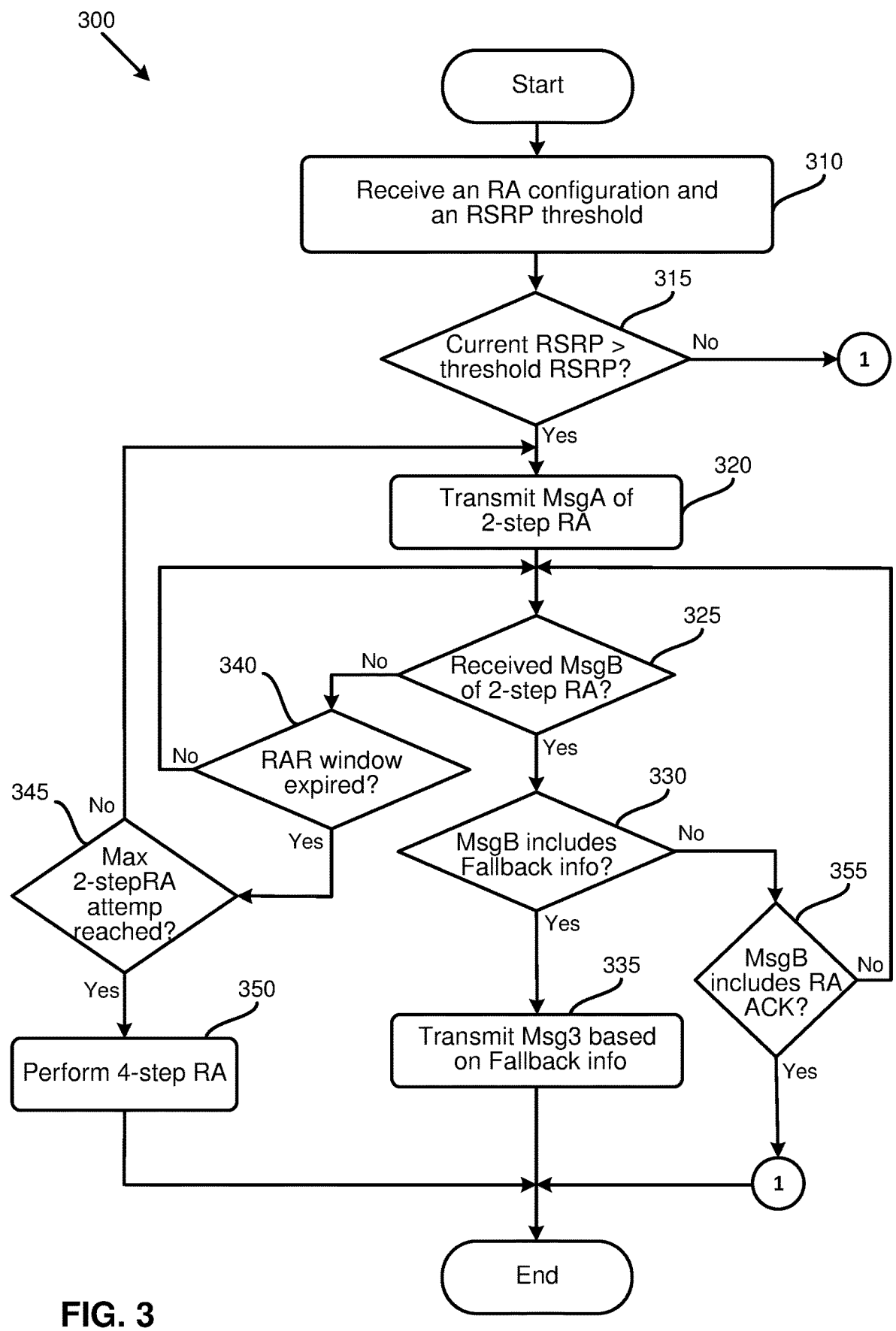
FIG. 3 is a flowchart illustrating a method (or process) for performing a 2-step RA procedure by a UE, according to an example implementation of the present application.

FIG. 3 is a flowchart illustrating a method (or process) 300 for performing a 2-step RA procedure by a UE, according to an example implementation of the present application. The process 300 may start in action 310 by receiving an RA configuration and an RSRP threshold value. In some of the present implementations, the RSRP threshold may be received as part of the RA configuration, while in other implementations, the RSRP threshold may be received separately.

The process 300 may then determine, in action 315, whether a detected RSRP value is greater than (or is above) the received RSRP threshold value (e.g., after the UE initiates/triggers an RA procedure). In some of the present implementations, the UE may detect the current value of the RSRP after the RA procedure is initiated/triggered. In some other aspects of the present implementations, the UE may detect the RSRP value at certain (or preconfigured) time intervals. In some of such implementations, the UE may compare the received RSRP threshold value with the most recently detected RSRP value after the UE initiates/triggers the RA procedure.

When the process 300 determines that the current RSRP value is not greater than (or equal to) the threshold RSRP value, the process may end. On the other hand, if the process 300 determines that the current RSRP value is greater than the RSRP threshold value, the process may transmit, in action 320, the first message (or MsgA) of the 2-step RA procedure to the base station. In some of the present implementations, the process 300 may transmit a preamble of the first message (MsgA) on a PRACH to the base station, and transmit a payload of the first message on a PUSCH to the base station.

In action 325, the process may determine whether the second message (or MsgB) of the 2-step RA procedure is received. In some of the present implementations, the second message may include a MAC subPDU including a signaling radio bearer (SRB) service data unit (SDU). If the process 300 determines that no MsgB is received (e.g., on a PDCCH occasion configured for MsgB reception), the process may move to action 340 which is described below. If the process 300 determines that a MsgB is received, the process of some of the present implementations may determine, in action 330, whether the received MsgB includes fallback information (or the response for fallback information) associated with the transmitted MsgA. If the process 300 determines that the received MsgB includes the fallback information, the process may transmit, in action 335, a Msg3 to the base station based on the fallback information.

In some of the present implementations, the process 300 may determine whether the MsgB includes the fallback information or not by determining whether a subheader in the MAC subPDU indicates the response is a fallback RAR or a success RAR. In some of the present implementations, the process 300 may transmit the payload of the first message (MsgA) to the base station using the uplink grant indicated in the fallback information of the second message (MsgB) received from the base station. After transmitting the Msg3, the process may end. It should be noted that the process 300 is only illustrating how a 2-step RA procedure may be performed in some of the present implementations. As such, even though the process 300 ends after falling back to a 4-step RA procedure and transmitting the Msg3, the 2-step RA procedure may not end in some of such implementations. That is, the UE may monitor the downlink (e.g., a configured control resource set) for receiving a Msg4 from the base station after transmitting the Msg3 to determine whether the 4-step RA procedure is completed successfully or not.

If the process 300 determines, in action 330, that the MsgB does not include any fallback information, the process may determine, in action 355, whether an acknowledgment corresponding to the sent MsgA is included in the MsgB (i.e., whether the MsgB includes a success RAR, or whether the MsgB's reception is considered to be successful). If the process 300 determines that the MsgB does not include a success RAR associated with the transmitted MsgA, the process may return to action 325 to determine whether another MsgB is received (e.g., whether a new response in the MsgB is received). In some of the present implementations, the second message (or MsgB) may include one or more responses associated with one or more of fallback RAR (information) and success RAR (information). When the process determines, in action 335, that the MsgB includes a success RAR, the process 300 may determine that the 2-step RA procedure has completed successfully and then end.

It is important to note that in some other aspects of the present implementations, the process 300 may determine whether a success RAR is received first (in action 355), and if no success RAR is received, the process may determine whether the MsgB includes a fallback RAR (in action 330). That is, in some of the present implementations, the process 300 may perform action 355 before action 330.

In some of the present implementations, after transmitting the MsgA, the process 300 may start a MsgB RAR window and the UE may monitor the PDCCH identified by the MsgB-RNTI for a MsgB reception. As described above, while the window is running, the UE may receive more than one MsgB (or more than one response in the MsgB) and some received responses may not contain any success RAR, or any fallback RAR related to the UE. In some of such implementations, the reception of the MsgB may not be considered as successful.

For example, when a UE receives a MsgB #1, the UE may check whether the MsgB #1 includes any of the fallback- RAR #1, fallbackRAR #2, successRAR #1, and successRAR #2. If the associated PAPID is not included in the fallbackRAR #1 and fallbackRAR #2, the UE may determine that the fallback information (if any) is irrelevant. Then the UE may check the successRAR #1 and successRAR #2. If the associated Contention Resolution ID is not included in any of the successRAR #1 and successRAR #2, the UE may determine that the successRAR #1 and successRAR #2 are both irrelevant.

Since the RAR window is still running, the UE may keep receiving other MsgBs. For example, the UE may receive a second MsgB before the MsgB RAR window expires. The UE may check the second received MsgB and determine that the message includes a fallbackRAR #3, a fallbackRAR #4, and a successRAR #3. In case that the associated PAPID is included in the fallbackRAR #4, the UE may determine that the required fallback information is received and may transmit a Msg3 on the received UL grant. In some of the present implementation, if the RAR window is still running and either an associated success RAR, or an associated Fallback RAR is received, the MsgB reception is considered as successful. On the other hand, if the RAR window expires, and neither success RAR nor Fallback RAR is received, then the UE may retransmit the first message, as described below in action 345. In the described example, since the second MsgB includes related fallback information (in fallbackRAR #4), the MsgB reception is considered to be successful.

Additionally, in the present example, if the associated contention resolution ID is included in the successRAR #3, the UE may also consider the MsgB reception as being successful. As described above, if the window expires and neither related fallback information nor success information is received, the MsgB reception is considered as being not successful (in this round) and may retransmit another preamble (or another MsgA).

Returning to FIG. 3, when the process 300, in action 325, determines that no MsgB is received yet, the process may determine, in action 340, whether the RAR window has expired. If the process 300 determines that the RAR window has not expired yet, the process may return to action 325 (to determine whether a MsgB is received, or another response in the MsgB is received). On the other hand, if the process determines that the RAR window has expired, the process may determine, in action 345, whether a maximum (or threshold) number of transmissions of the MsgA has been reached. The maximum transmission number may be configured to the UE by a base station, or may be predefined.

If the process determines that the maximum (or threshold) number of retransmissions of the MsgA has not been reached yet, the process 300 may return to action 320 to retransmit the MsgA (e.g., after increasing the preamble transmission counter by one, as described above). On the other hand, if the process 300 determines that the maximum number of retransmissions of the MsgA has been reached, in some of the present implementations, the process may switch back to performing, in action 350, a normal (or enhanced) 4-step RA procedure, as described above. The process may then end.

Figure 4:
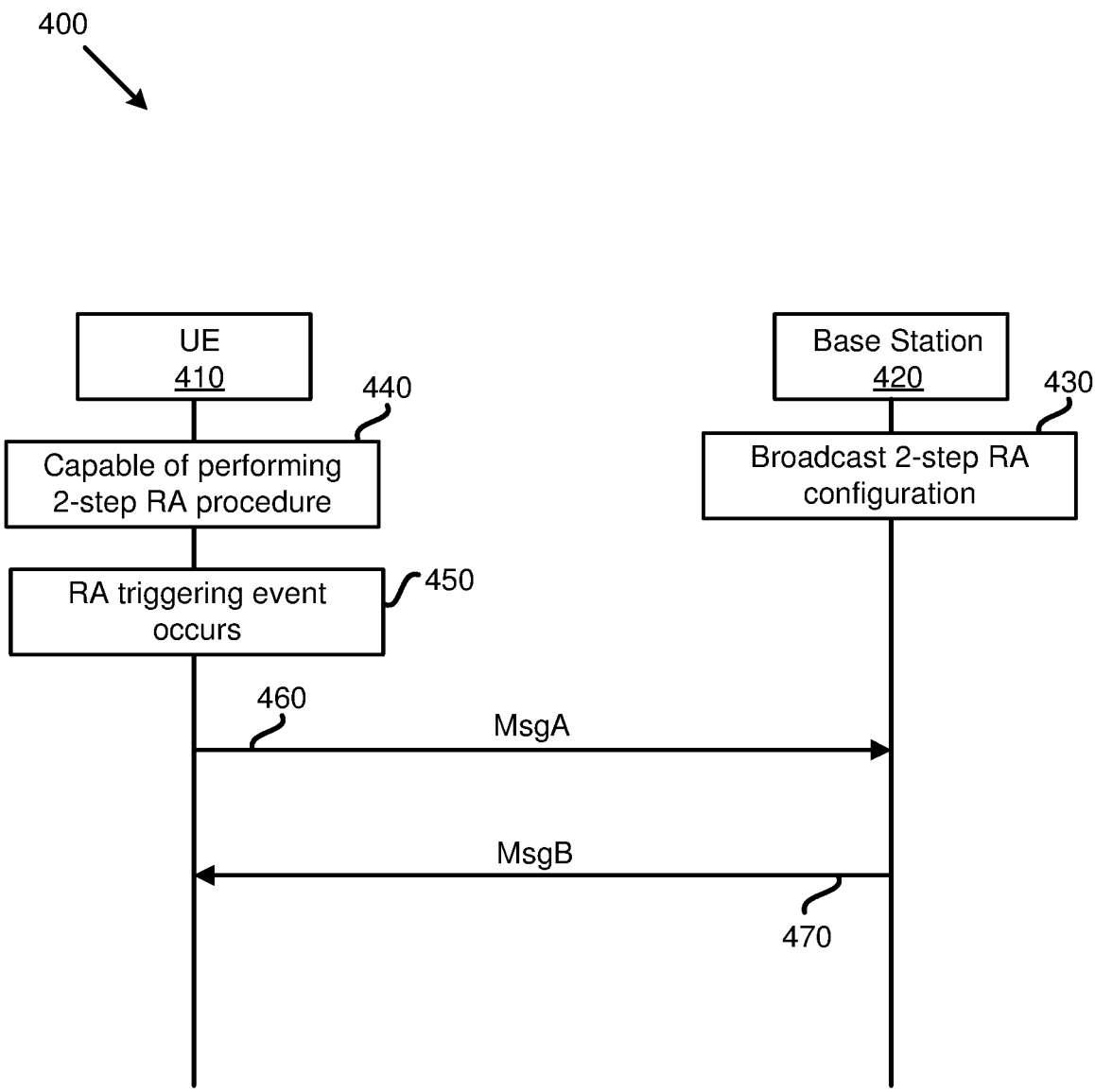
FIG. 4 is a diagram illustrating communications between a UE and a base station in a 2-step RA procedure, according to an example implementation of the present application.

FIG. 4 is a diagram 400 illustrating communications between a UE and a base station in a 2-step RA procedure, according to an example implementation of the present application. FIG. 4 includes a UE 410, and a base station (e.g., a gNB) 420. As shown in the figure the base station 420 may broadcast, in action 430, the configuration parameters for a 2-step RA procedure. The 2-step configuration may be received by the UE 410 through the system information (e.g., the SIB1 or other SI blocks) in some of the present implementations. Although the configuration parameters are shown to be broadcast in FIG. 4, in some aspects of the present implementations, the 2-step RA procedure configuration may be transmitted to the UE 410 through dedicated signaling instead of, or in conjunction with the SI broadcasting.

The parameters of 2-step RA procedure, in some of the present implementations, may include, but are not limited to, prach-ConfigurationIndex, preambleReceivedTargetPower, rsrp-ThresholdSSB, rsrp-ThresholdCSI-RS, rsrp-ThresholdSSB-SUL, candidateBeamRSList, powerControlOffset, powerRampingStep, powerRampingStepHighPriority, scalingFactorBI, ra-PreambleIndex, ra-ssb-OccasionMaskIndex, ra-OccasionList, ra-PreambleStartIndex, preambleTransMax, and ssb-perRACH-OccasionAndCBPreamblesPerSSB.

In some of the present implementations, the prach-ConfigurationIndex may be the available set of PRACH occasions for the transmission of the Random Access Preamble. The preambleReceivedTargetPower may be the initial Random Access Preamble power (i.e., the target power level at the network receiver side). The rsrp-ThresholdSSB may be an RSRP threshold for the selection of the SSB and the corresponding Random Access Preamble and/or PRACH occasion. If the Random Access procedure is initiated for a beam failure recovery, the rsrp-ThresholdSSB used for the selection of the SSB within a candidateBeamRSList may refer to the rsrp-ThresholdSSB in the BeamFailureRecoveryConfig IE. The rsrp-ThresholdCSI-RS may be an RSRP threshold for the selection of the CSI-RS and the corresponding Random Access Preamble and/or PRACH occasion. If the Random Access procedure is initiated for a beam failure recovery, the rsrp-ThresholdCSI-RS may be set to a value calculated by multiplying the rsrp-ThresholdSSB in the BeamFailureRecoveryConfig IE by a powerControlOffset as specified in the 3GPP technical specification (e.g., TS 38.214). The content of the 3GPP TS 38.214 is hereby incorporated by reference in its entirety. The rsrp-ThresholdSSB-SUL may be an RSRP threshold for the selection between the NUL (Normal Uplink) carrier and the SUL (Supplementary Uplink) carrier. The candidateBeamRSList may be a list of reference signals (CSI-RS and/or SSB) identifying the candidate beams for recovery, and the associated Random Access parameters.

In some of the present implementations, the powerControlOffset may be a power offset between the rsrp-ThresholdSSB and the rsrp-ThresholdCSI-RS and may be used when the Random Access procedure is initiated for a beam failure recovery. The powerRampingStep may be a power-ramping factor. The powerRampingStepHighPriority may be a power-ramping factor in case of a differentiated Random Access procedure. The scalingFactorBI may be a scaling factor for the differentiated Random Access procedure. The ra-PreambleIndex may be a Random Access Preamble. The ra-ssb-OccasionMaskIndex may define the PRACH occasion(s) associated with an SSB in which the MAC entity may transmit a Random Access Preamble. The ra-OccasionList may define the PRACH occasion(s) associated with a CSI-RS in which the MAC entity may transmit a Random Access Preamble. The ra-PreambleStartIndex may be the starting index of the Random Access Preamble(s) for an on-demand SI request. The preambleTransMax may be the maximum number of Random Access Preamble transmissions. The msgATransMax may be the maximum number of MsgA transmissions. In some of the present implementations, the preambleTransMax and the msgAsTranMax may be both provided in a 2-step RA configuration. The ssb-perRACH-OccasionAndCB-Preambles-PerSSB (for SpCells only) may define the number of SSBs mapped to each PRACH occasion and the number of Random Access Preambles mapped to each SSB. In some of the present implementations, if the groupBconfigured is configured, then the Random Access Preamble group B may be configured.

In action 440, the UE 410 may be capable of performing a 2-step RA procedure. In action 450, a RA triggering event may occur, and the UE 410 may initiate/trigger a RA procedure. As described above, when a UE that has camped on a cell (e.g., of the base station 420) in an IDLE state, or an Inactive state, or a UE that is connected to a cell (e.g., of the base station 420), when a RA procedure is initiated/triggered, the UE 410 may transmit, in action 460, a MsgA to the base station 420.

For the connection resolution purpose, the UE 410 may include UE's specific ID in the payload part of the transmitted MsgA. For example, the UE 410 may transmit the MsgA including a UE ID #1 to the base station 420. Once the MsgA is transmitted, the MAC entity of the UE 410 may start the ra-Response Window to receive a corresponding MsgB. If the ra-Response Window expires and no MsgB containing (i) a Random Access Preamble identifier(s) that matches the transmitted preamble (the preamble's associated index) and (ii) a contention resolution ID associated with the MsgA is received, the RAR reception (or the MsgB reception) is considered to be unsuccessful in some of the present implementations. As shown in FIG. 4, if the UE 410 receives the MsgB in action 470, and the MsgB contains an associated Contention Resolution ID, then the contention resolution is considered to be successful. That is, the initiated 2-step RA procedure is completed. In some of the present implementations, when the UE considers that its 2-step RA procedure is successful, the UE may set the C-RNTI as the one indicated in the MsgB (or in the MAC RAR with the associated Contention Resolution ID).

Figure 5:
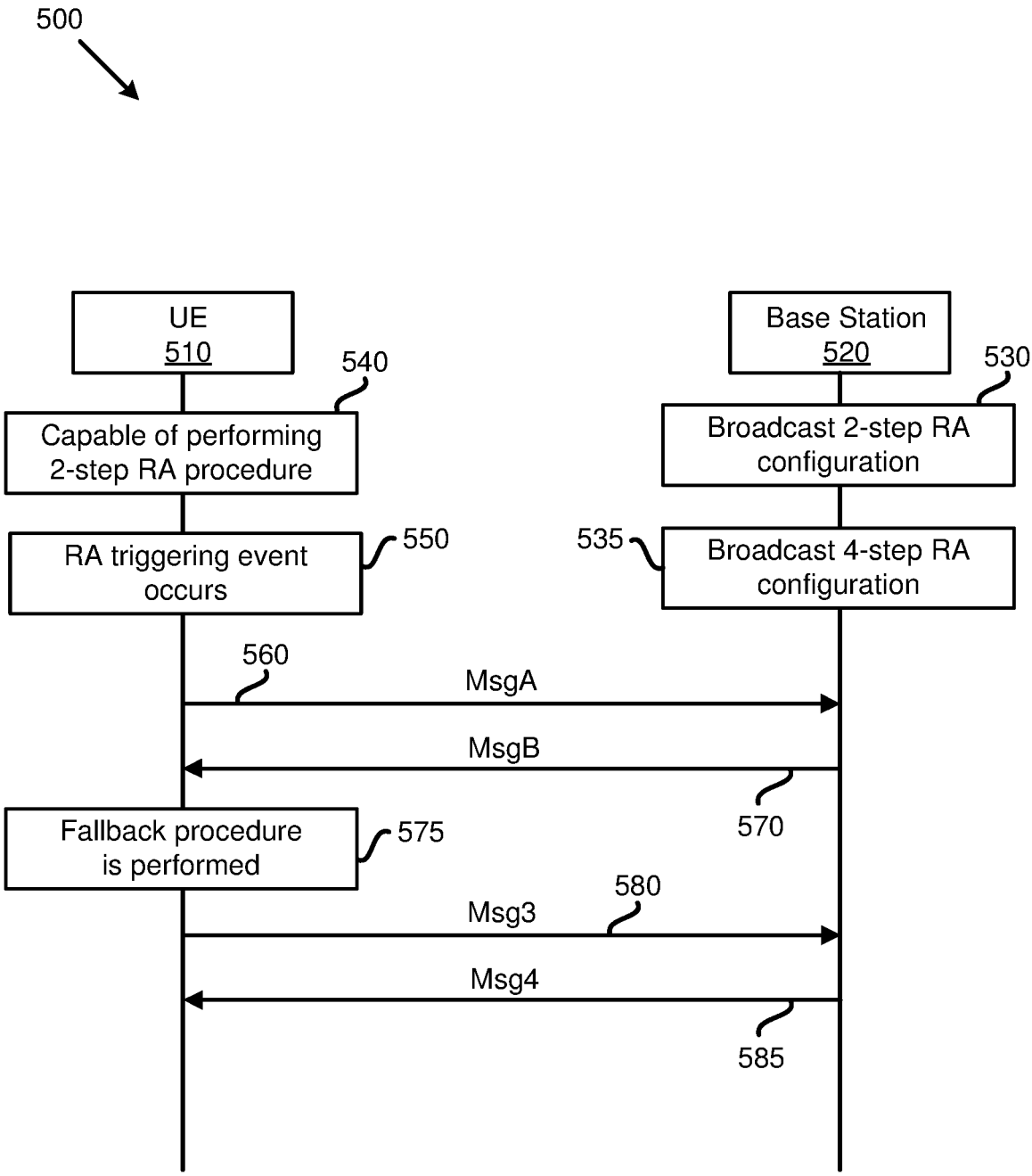
FIG. 5 is a diagram illustrating a fallback mechanism to a 4-step RA procedure during a 2-step RA procedure, according to an example implementation of the present application.

FIG. 5 is a diagram 500 illustrating a fallback mechanism to a 4-step RA procedure during a 2-step RA procedure, according to an example implementation of the present application. FIG. 5 includes a UE 510, and a base station (e.g., a gNB) 520. Similar to FIG. 4, the base station 520 may broadcast, in action 530, the configuration parameters for a 2-step RA procedure. In action 540, the UE 510 may be capable of performing the 2-step procedure. In FIG. 5, however, the base station 520 may also broadcast configuration parameters for a 4-step RA procedure (e.g., in the system information) as well.

As discussed above, a base station, in some aspects of the present implements, may transmit (e.g., to the UE 510) the configuration for a 2-step RA procedure separately from the configuration for a 4-step RA procedure (as shown in FIG. 5), while in other aspects of the present implementations, these two configurations may be transmitted to the UE together. Additionally, in some of the present implementations, the parameters of a 2-step RA procedure and the parameters of a 4-step RA procedure may be broadcast in the same System Information Block or in different system information blocks.

Similar to what is described above, with reference to FIG. 4, upon an RA triggering event occurs in action 550, the UE 510 may transmit, in action 560, a MsgA to the base station 520. After transmitting the MsgA, the UE 510 may receive, in action 570, a MsgB from the base station 520. If the received MsgB contains an RA preamble identifier(s) that matches the transmitted preamble index and a Temporary C-RNTI, the UE may perform a fallback mechanism in action 575, and transmit, in action 580, a Msg3 of a 4-step RA procedure. In some of the present implementations, the UE 510 may transmit the Msg3 to the base station 520 on an UL grant that is indicated in MsgB (e.g., in the associated response for fallback information included in MsgB), and based on the broadcasting parameters of the 4-step RA procedure. The result of the RA procedure, in some of the present implementations, may depend on the information (e.g., a C-RNTI MAC CE) that is included in the Msg3.

For example, in some of the present implementations, if the Random Access procedure is initiated by the MAC sublayer of the UE, or if the RA procedure is initiated by the RRC sublayer of the UE and the PDCCH transmission is addressed to the C-RNTI and contains a UL grant for a new transmission, then the Contention Resolution may be considered as successful which means that the RA procedure has been successfully completed. In some of the present implementations, if the RA procedure is initiated by a PDCCH order and the PDCCH transmission is addressed to the C-RNTI, the Contention Resolution may also be considered as successful. In some of the present implementations, if the RA procedure is initiated for a beam failure recovery and the PDCCH transmission is addressed to the C-RNTI, the Contention Resolution may also be considered as successful.

Similarly, if the CCCH SDU is included in the Msg3 and the PDCCH transmission is addressed to its TEMPORARY_C-RNTI and if the MAC PDU contains a Contention Resolution Identity MAC CE that matches the CCCH SDU transmitted in the Msg3, some of the present implementations may consider the Contention Resolution to be successful, and the RA procedure to be successfully completed.

Figure 6:
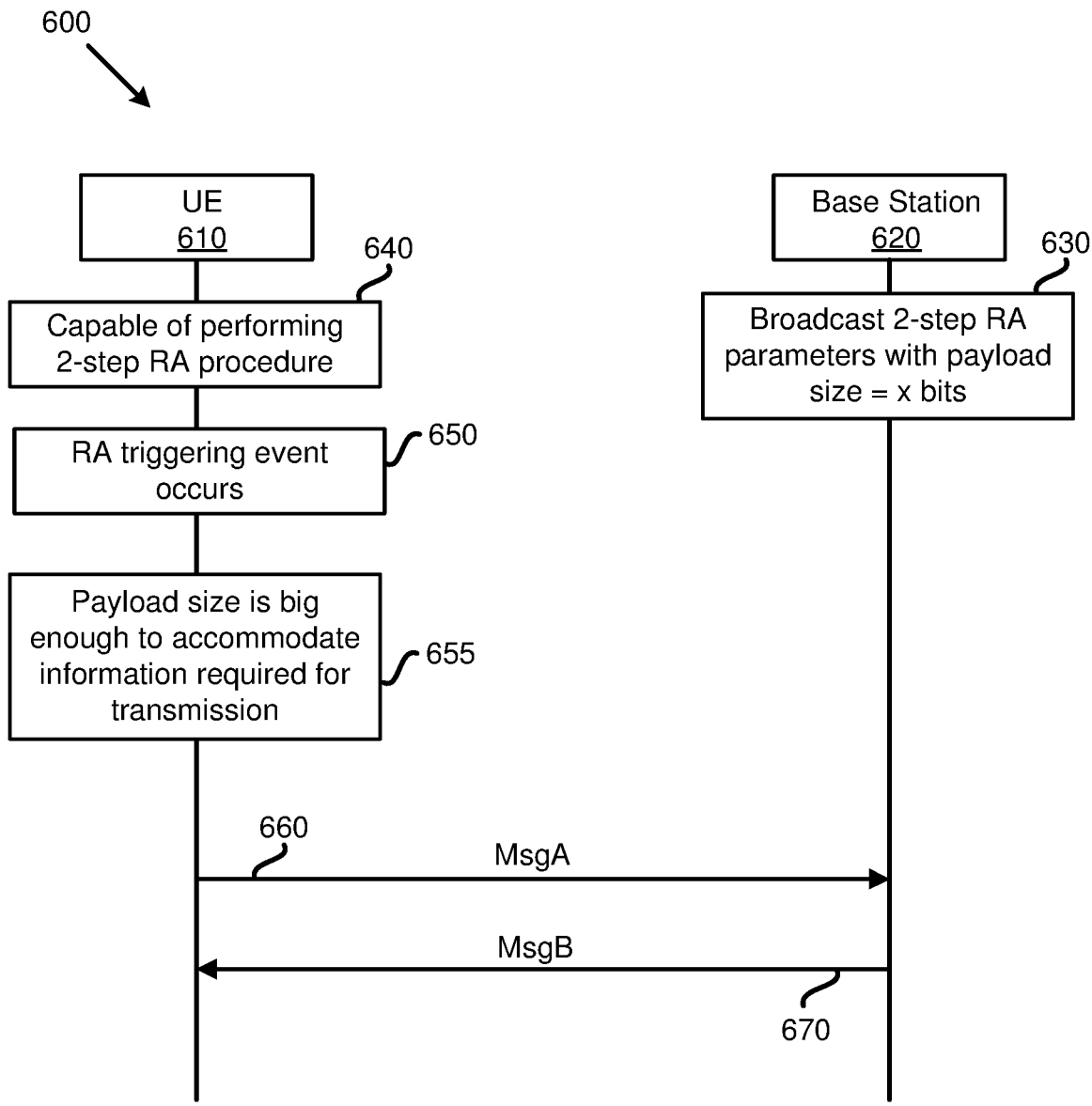
FIG. 6 is a diagram illustrating a UE performing a 2-step RA procedure based on a 2-step RA configuration received from a base station, according to an example implementation of the present application.
Figure 7:
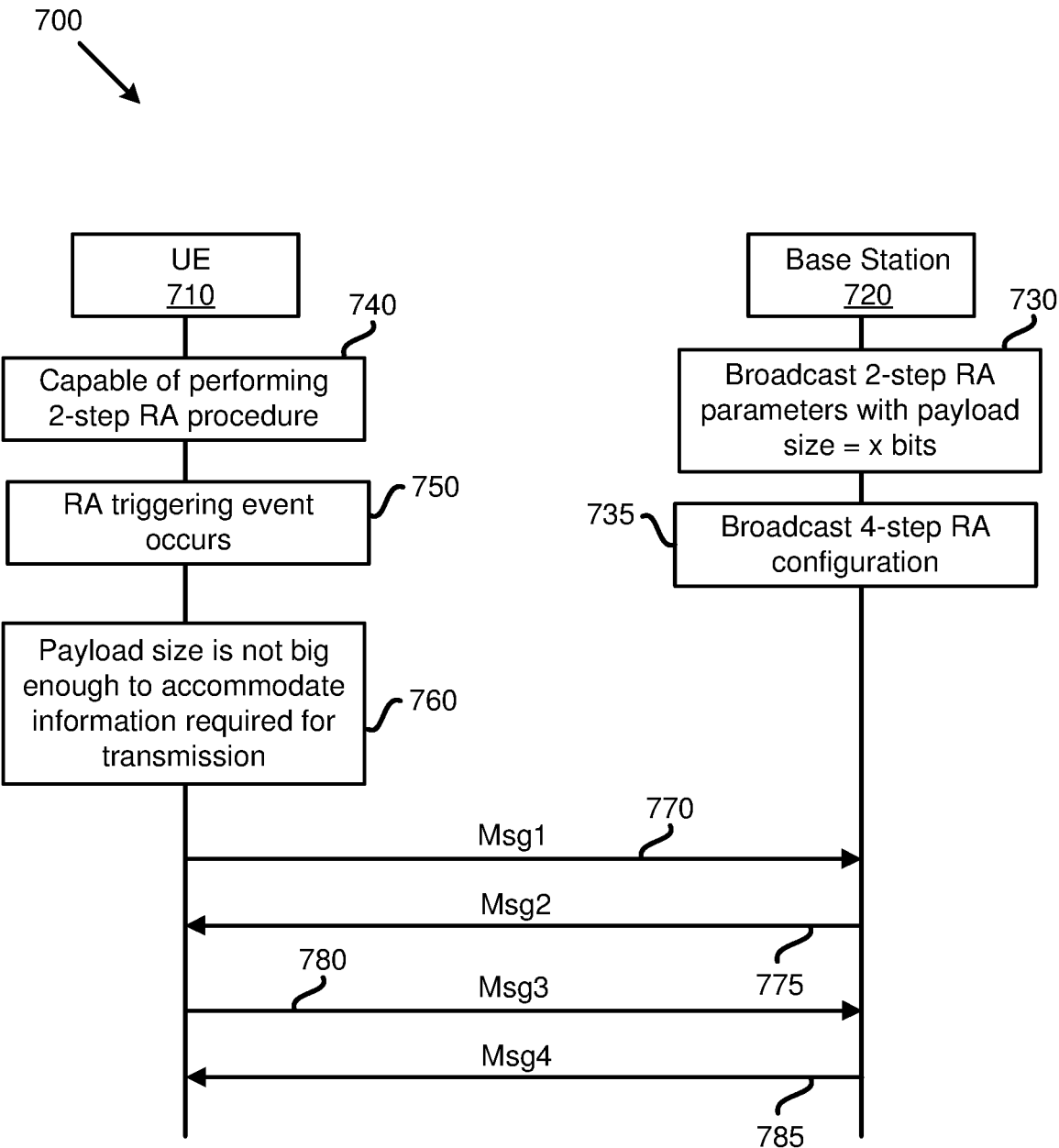
FIG. 7 is a diagram illustrating a UE performing a 4-step RA procedure based on the received RA configuration, according to an example implementation of the present application.

FIGS. 6 and 7 illustrate a UE deciding to perform a 2-step RA procedure or a 4-step RA procedure based on a 2-step RA configuration received from a base station, according to an example implementation of the present application. More specifically, FIG. 6 is a diagram 600 illustrating a UE performing a 2-step RA procedure based on a 2-step RA configuration received from a base station, while FIG. 7 is a diagram 700 illustrating a UE performing a 4-step RA procedure based on the received RA configuration, according to an example implementation of the present application. FIG. 6 includes a UE 610 and a base station (e.g., a gNB) 620. Similar to FIG. 5, the base station 620 may broadcast, in action 630, the configuration parameters for a 2-step RA procedure, and in action 640, the UE 610 may be capable for performing the 2-step procedure. As shown in FIG. 6, the broadcast configuration parameters, in some of the present implementations, may include a payload size parameter that indicates the size of the payload that the UE may include in the MsgA.

That is, in some of the present implementations, the 2-step RA configuration (e.g., broadcast in the system information) may include the association between the PRACH preambles (or resources) and the PUSCH resources. The PUSCH resources, in some of the present implementations, may be used by the UE 610 to transmit the payload part of the MsgA in the 2-step RA procedure. As shown in FIG. 6, the payload size (e.g., based on the configured PUSCH resources) may be x bits (x being an integer greater than 0). When an RA triggering event occurs in action 650, the UE 610 may transmit the MsgA to the base station 620 by considering, in action 655, the available payload size provided by the base station 620.

In some of the present implementations, if the size of the payload (e.g., x bits in this example) is enough to accommodate the information required for transmitting the payload part of the MsgA, the UE 610 may transmit, in action 660, the MsgA to the base station 620. After the UE 610 receives, in action 670, the MsgB contains the associated Contention Resolution ID, the UE 610 may decide that the contention resolution is successful and the 2-step RA procedure is complete.

FIG. 7 includes a UE 710, and a base station (e.g., a gNB) 720. Similar to FIG. 6, the base station 720 may broadcast, in action 730, the configuration parameters for a 2-step RA procedure, and in action 740, the UE 710 may be capable of performing the 2-step procedure. As shown in FIG. 7, the broadcast configuration parameters, in some of the present implementations, may include a payload size parameter that indicates the size of the payload that the UE may include in the MsgA. FIG. 7 also shows that the base station 720, in addition to the 2-step RA configuration, may also broadcast, in action 735, the 4-step RA configuration to the UE 710 in some of the present implementations.

As described above, with reference to FIG. 6, in some of the present implementations, the 2-step RA configuration (e.g., broadcast in the system information) may include the association between the PRACH preambles (or resources) and the PUSCH resources. The PUSCH resources, in some of the present implementations, may be used by the UE 710 to transmit the payload part of the MsgA in the 2-step RA procedure. As shown in FIG. 7, the payload size (e.g., based on the configured PUSCH resources) may be x bits (x being an integer greater than 0). When an RA triggering event occurs in action 750, the UE 710 may determine, in action 760, that the size of the payload (e.g., x bits in this example) is not enough to accommodate the information required for transmitting the payload part of the MsgA. As such, instead of transmitting a MsgA to the base station 720, the UE may forgo performing the 2-step RA procedure and start performing a normal 4-step RA procedure.

That is, as shown in the illustrated example of FIG. 7, the UE 710 may send, in action 770, an RA preamble (Msg1) to the base station 720. In response, in action 775, the base station 720 may send a RAR (Msg2) to the UE 710, for example, on a DL-SCH. After receiving the RAR, the UE 710 may send, in action 780, a first scheduled UL transmission (Msg3), for example, on a ULSCH to the base station 720. After the base station 720 receives the first scheduled UL transmission, the base station may send, in action 785, a Contention Resolution message (Msg4) to the UE 710 on the DL.

Figure 8:
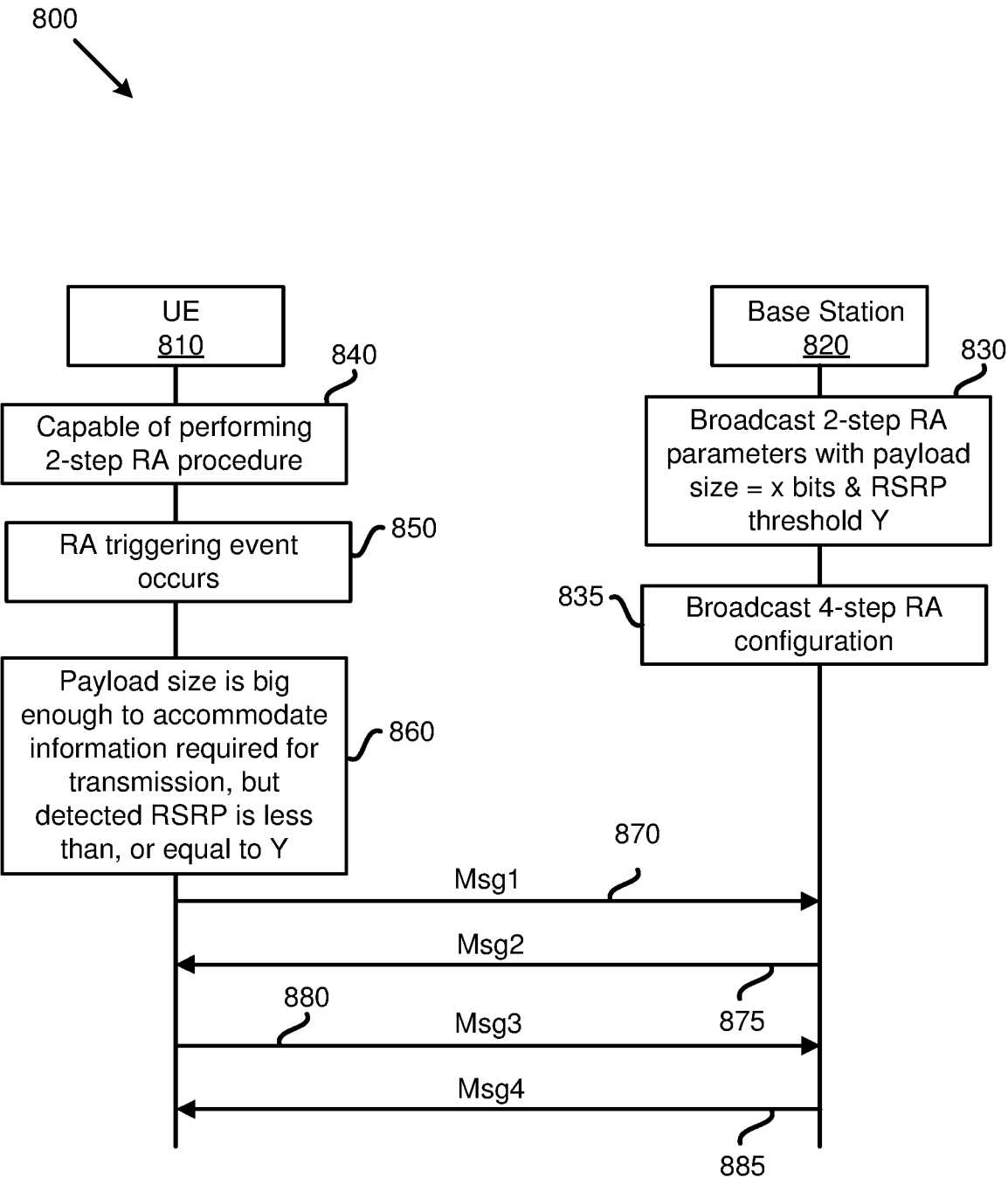
FIG. 8 is a diagram illustrating a UE deciding to perform a 2-step RA procedure or a 4-step RA procedure based on a detected RSRP value, according to an example implementation of the present application.

FIG. 8 is a diagram 800 illustrating a UE deciding to perform a 2-step RA procedure or a 4-step RA procedure based on a detected RSRP value, according to an example implementation of the present application. FIG. 8 includes a UE 810, and a base station (e.g., a gNB) 820. Similar to FIG. 7, the base station 820 may broadcast, in action 830, the configuration parameters for a 2-step RA procedure, and in action 840, the UE 810 may be capable of performing the 2-step procedure. As shown in FIG. 8, the broadcast configuration parameters, in some of the present implementations, may include a payload size parameter that indicates the size of the payload that the UE may include in the MsgA, as well as an RSRP threshold value Y. As described above, the RSRP threshold may be part of the 2-step RA configuration in some aspects of the present implementations, while in other aspects of the present implementations, the RSRP threshold may be received separately (i.e., separate from the 2-step RA configuration). FIG. 8 also shows that the base station 820, in addition to the 2-step RA configuration, may also broadcast, in action 835, the 4-step RA configuration to the UE 810 in some of the present implementations.

As described above, with reference to FIGS. 6 and 7, in some of the present implementations, the 2-step RA configuration (e.g., broadcast in the system information) may include the association between the PRACH preambles (or resources) and the PUSCH resources. The PUSCH resources, in some of the present implementations, may be used by the UE 810 to transmit the payload part of the MsgA in the 2-step RA procedure. As shown in FIG. 8, the payload size (e.g., based on the configured PUSCH resources) may be x bits (x being an integer greater than 0). When an RA triggering event occurs in action 850, the UE 810 may determine, in action 860, that even though the size of the payload (e.g., x bits in this example) is enough to accommodate the information required for transmitting the payload part of the MsgA, but a detected RSRP value (e.g., last detected RSRP of the downlink pathloss reference by the UE 810) is less than (or equal to) the received RSRP threshold value of Y. As such, instead of transmitting a MsgA to the base station 820, the UE may start performing a 4-step RA procedure.

That is, as shown in the illustrated example of FIG. 8, the UE 810 may send, in action 870, an RA preamble (Msg1) to the base station 820. In response, in action 875, the base station 820 may send a RAR (Msg2) to the UE 810, for example, on a DLSCH. After receiving the RAR, the UE 810 may send, in action 880, a first scheduled UL transmission (Msg3), for example, on a ULSCH to the base station 820. After the base station 820 receives the first scheduled UL transmission, the base station may send, in action 885, a Contention Resolution message (Msg4) to the UE 810 on the DL. It should be noted that after determining the payload size and the RSRP, the UE 810 may determine to perform either a 2-step RA procedure or a 4-step RA procedure. That is, if the UE determines to perform a 4-step RA procedure, the UE may not fallback to a 2-step RA procedure until the 4-step RA procedure is completed successfully or fail to complete (e.g., due to an RA problem).

As described above, the MAC subPDU may include a subheader and a payload. The MAC payload (or MAC RAR) may include different fields. For example, a MAC RAR may have a fixed size and include an R field, a TAC field, a UL grant field, and a temporary C-RNTI field. The R field may include a reserved bit, and may be set to "0". The Timing Advance Command (TAC) field may indicate the index value the TA uses to control the amount of timing adjustment that the MAC entity (at the UE side) has to apply. The size of the Timing Advance Command field may be 12 bits. The UL Grant field may indicate the resources to be used on the uplink (e.g., for a Msg3 transmission). The size of the UL Grant field may be 27 bits. The temporary C-RNTI field may indicate the temporary identity that is used by the MAC entity during the RA procedure. The size of the temporary C-RNTI field may be 16 bits.

In some of the present implementations, a format field in the MAC RAR may also indicate what format the MAC RAR has used. For example, if the format field is set to "0", the MAC RAR may include the Reserved bit, Timing Advance Command, UL Grant, and Temporary C-RNTI. If the format field is set to "1", however, the size of the MAC RAR may be variable and may include additional fields (e.g., instead of, or in addition to, the Reserved bit, Timing Advance Command, UL Grant, Contention Resolution ID, and C-RNTI). In some of the present implementations, when the format field is set to "1", some or all of the fields may include a present field which indicates whether the field is present or not. For example, in a small cell deployment, Timing Advance Command is not required, and the associated present field of the Timing Advance Command field may be set to "0" to indicate the absence of this field. As another example, for Other SI request, the UL Grant is not required, and as such, the associated present field of the UL grant field may be set to "0".

In some of the present implementations, a type field in the MAC RAR may also indicate whether the C-RNTI field or the Temporary C-RNTI is included. In some of the present implementations, a type field in the MAC subheader associated with the MAC RAR (e.g., within a MAC subPDU) may indicate whether the C-RNTI or Temporary C-RNTI is included in the MAC RAR. In some of the present implementations, a field in the MAC RAR may indicate whether a C-RNTI is included or not. In some of the present implementations, a field in the MAC subheader may indicate whether a C-RNTI is included or not. In some of the present implementations, a field in the MAC RAR may indicate whether a timing advance is included or not. In some of the present implementations, a field in the MAC subheader may indicate whether a timing advance is included or not. In some of the present implementations, there a field in the MAC RAR (e.g., MAC CE) may indicate whether the UL grant is included or not. In some of the present implementations, a field within the MAC subheader may indicate whether the UL grant is included or not. In some of the present implementations, a field in the MAC RAR may indicate whether the payload part is received or not. In some of the present implementations, a field in the MAC subheader may indicate whether the payload part is received or not.

The above described fields (or indicators), in some of the present implementations, may also be included in an individual MAC subheader (e.g., of a MAC PDU consisting of one or more MAC RARs). The indicators may also be included in an individual MAC subheader (of the MAC PDU) and may explicitly indicate the alternatives, for example, based on a predefined look up table. For example, when performing a contention-free 2-step RA procedure, no UE specific ID (i.e., C-RNTI) may be required, but the UE may include some MAC CE(s) (e.g., PHR or BSR) in the payload part. In such a case, the UE may consider the RAR reception successful, but may need to retransmit the missing MAC CE(s) to the base station.

In some of the present implementations, the MsgB may include a MAC RAR and a certain RRC message that is a response message to the RRC procedure indicated in the MsgA. For example, if an RRC resume request message (or another RRC message for a similar purpose) is transmitted in the MsgA, the base station may transmit an RRC resume (or another RRC message for a similar purpose) back to the UE.

Figure 9:
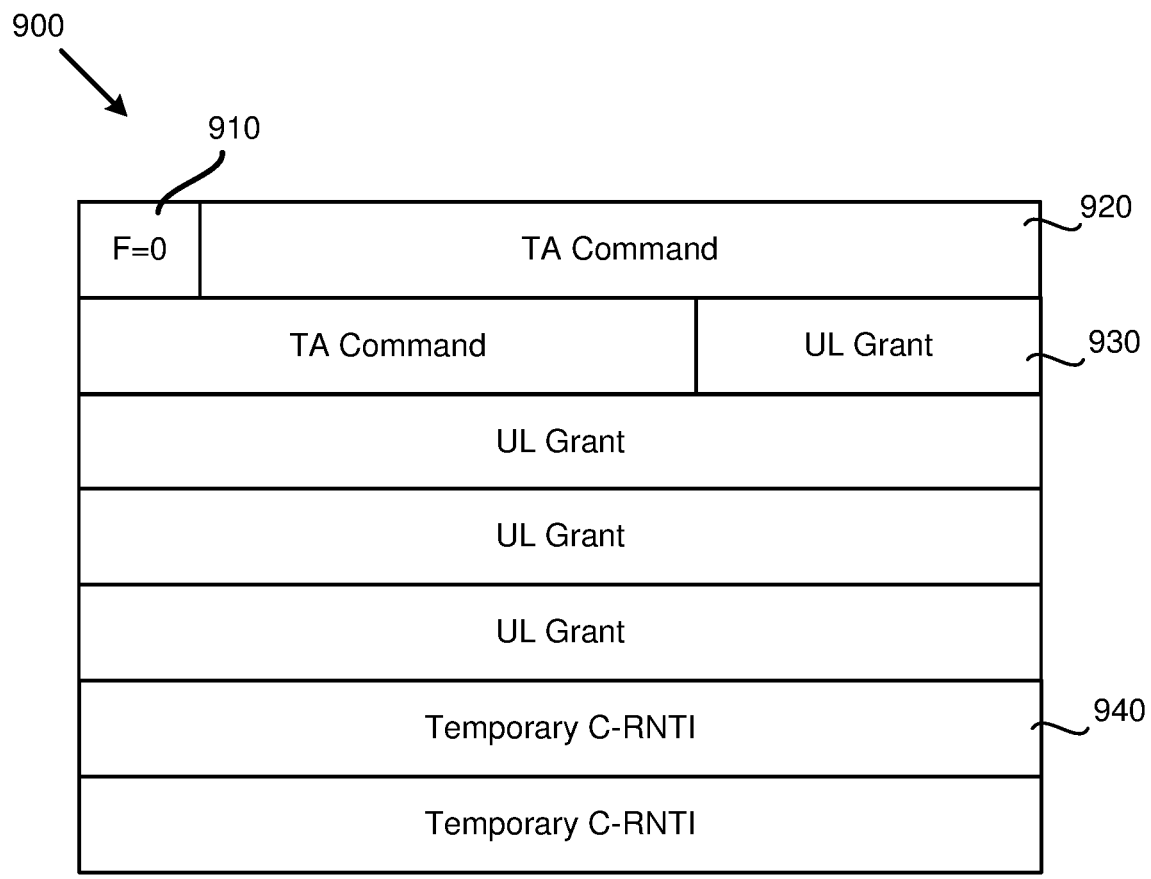
FIG. 9 is an example data structure for a MAC payload of a RAR (or a MAC RAR) that supports the 2-step RA procedure, according to one example implementation of the present application

FIG. 9 is an example data structure 900 for a MAC payload of a RAR (or a MAC RAR) that supports the 2-step RA procedure, according to one example implementation of the present application. As shown in FIG. 9, the MAC RAR, in some of the present implementations, may be octet aligned and may include, but is not limited to, a format field 910, a Timing Advance Command field 920, one or more UL Grant fields 930, and one or more temporary C-RNTI fields 940.

The Format field, in some of the present implementations, may indicate the RAR format or structure. That is, as described below, the MAC RAR for a 2-step RA procedure and the MAC RAR for a 4-step RA procedure may have different structures (e.g., may have different number of octets). Similarly, the MAC RAR for a 2-step RA procedure that supports a fallback mechanism for switching from the 2-step RA procedure to a 4-step RA procedure may also have a different structure (e.g., may have a different number of octets). As such, the format field 910 may indicate which structure the MAC RAR is using. In some of the present implementations, the size of the format field 910 may be one bit.

The TA Command field 920, in some of the present implementations, may indicate the index value that the TA uses to control the amount of timing adjustment that the MAC entity has to apply. The size of the Timing Advance Command field may be 12 bits in some of the present implementations.

The UL Grant field 930, in some of the present implementations, may indicate the resources to be used on the uplink. The size of the UL Grant field, in some of the present implementations, may be 27 bits.

The Temporary C-RNTI field 940, in some of the present implementations, may indicate the temporary identity that is used by the MAC entity during the Random Access procedure. The size of the Temporary C-RNTI field, in some of the present implementations, may be 16 bits.

As shown in FIG. 9, when the value of the format field 910 is set to "0", the MAC RAR 900 may include, in addition to the format field 910, the TA Command field 920, the UL Grant field 930, and the Temporary C-RNTI field 940. However, if the format field 910 includes a value of "1", the MAC RAR may include a different set of fields which is illustrated in the following FIG. 10.

Figure 10:
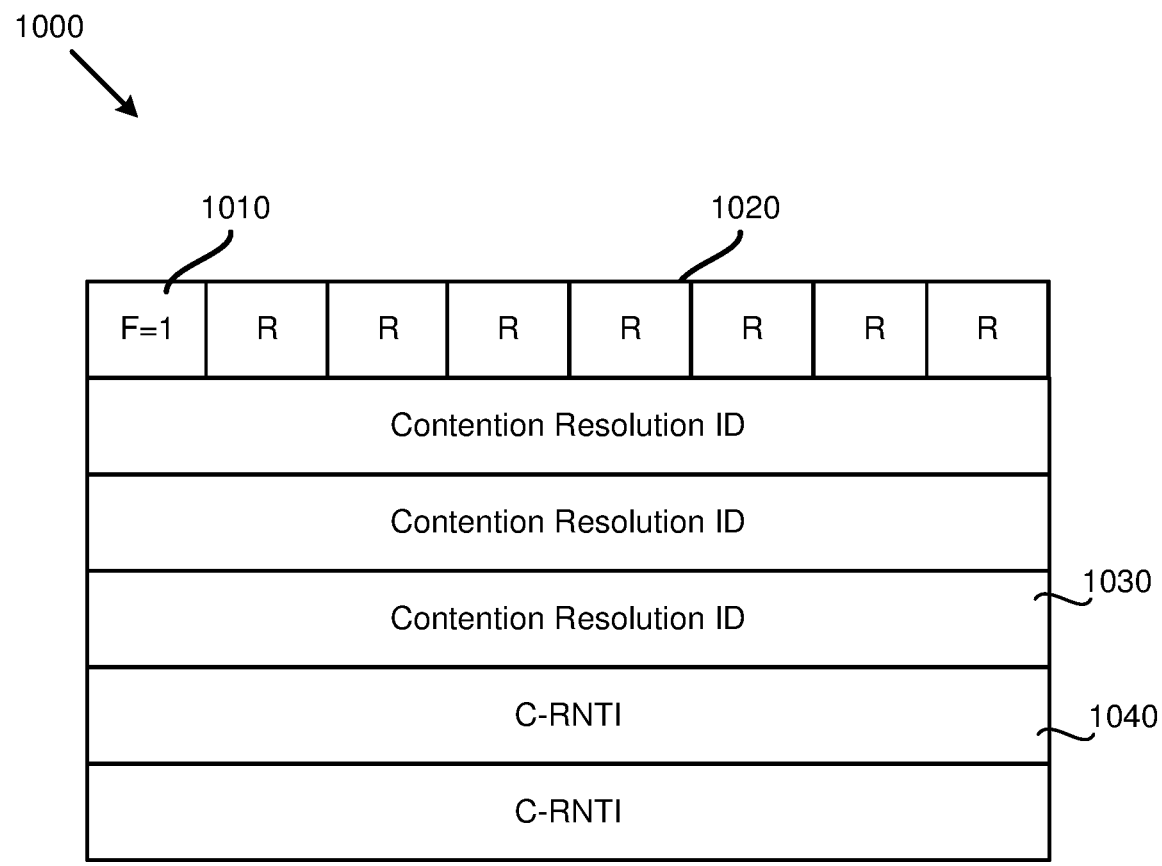
FIG. 10 is another example data structure for a MAC RAR that supports the 2-step RA procedure, according to one example implementation of the present application.

FIG. 10 is another example data structure 1000 for a MAC RAR that supports the 2-step RA procedure, according to one example implementation of the present application. As shown in FIG. 10, when the value of the format field 1010 is set to "1", the MAC RAR 1000 may include a set of Reserved fields (or bits) 1020, a Contention Resolution ID field 1030, and a C-RNTI field 1040. The C-RNTI field 1040 may contain the C-RNTI of the MAC entity. The length of the C-RNTI field 1040 may be 16 bits in some of the present implementations. The Contention Resolution ID field 1030, in some of the present implementations, may contain the Contention Resolution ID of a UE.

In some of the present implementations, the size of the Contention Resolution ID field 1030 may be 24 bits or pre-defined bits (e.g., 48 bits). In some aspects of the present implementations, for the different kinds of RAR formats to have the same size, additional Reserved bits may be added to the MAC RAR structure. For example, since the size of the MAC RAR 900 illustrated in FIG. 9 includes 7 octets, to make the MAC RAR 1000 illustrated in FIG. 10 have the same size as the MAC RAR 900 (i.e., 7 octets), some of the present implementations may add another 8 Reserved bits, such as R fields 1020, to the MAC RAR 1000.

Some of the present implementations may include a type field within a MAC subheader of a MAC RAR within a MAC subPDU to indicate whether one or more C-RNTI fields, or one or more Temporary C-RNTI fields are included in the MAC RAR. In some of the present implementations, the MAC subheader of the MAC RAR may include a type field to indicate whether a C-RNTI field is included in the MAC RAR or not. In some of the present implementations, the MAC subheader of the MAC RAR may include a field to indicate whether a timing advance field is included in the MAC RAR structure or not. In some of the present implementations, the RAR MAC CE may include a field to indicate whether one or more UL grant fields are included in the MAC RAR structure or not.

In some of the present implementations, the MAC subheader of the MAC RAR within a MAC subPDU may include a field to indicate whether the payload part is received or not. In some aspects of the present implementations, the above described fields (or indicators) may be included in the individual MAC subheader of the MAC PDU that includes the MAC RARs. The indicators included in the individual MAC subheader of the MAC PDU, in some of such implementations, may explicitly indicate the alternatives based on a predefined look up table.

Figure 11:
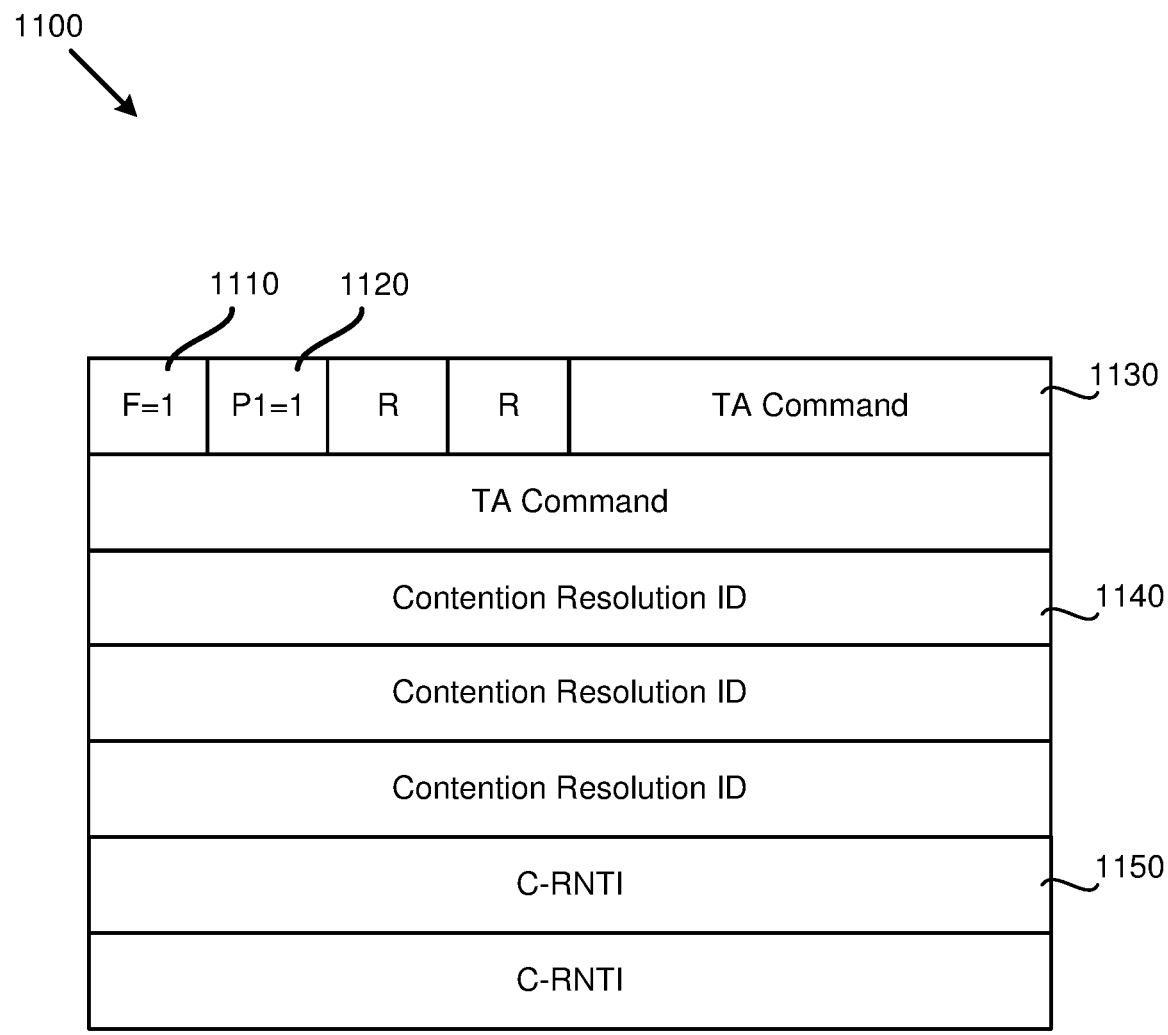
FIG. 11 is another example data structure for a MAC RAR that supports the 2-step RA procedure, according to one example implementation of the present application.

FIG. 11 is another example data structure 1100 for a MAC RAR that supports the 2-step RA procedure, according to one example implementation of the present application. As shown in FIG. 11, when the format field 1110 is set to "1" and the present field 1120 is set to "1", the MAC RAR 1100 may include a set of Reserved bits (e.g., two R fields in this example), a TA Command field 1130, a Contention Resolution ID field 1140, and a C-RNTI field 1150. In some of the present implementations, the size of the Contention Resolution ID field 1140 may be 24 bits. In some of the present implementations, in order for the different MAC RAR formats to have the same size, additional Reserved bits may be added to the MAC RAR formats. For example, since the size of the MAC RAR 1100 shown in FIG. 11 is 7 octets, a set of additional 8 Reserved bits (or R fields) may be added to the MAC RAR. In some of the present implementations, when the format field is set to "1" and the P1 field is set to "0", the MAC RAR may include the set of Reserved bits, the Contention Resolution ID field, and the C-RNTI field, without TA command field.

Figure 12:
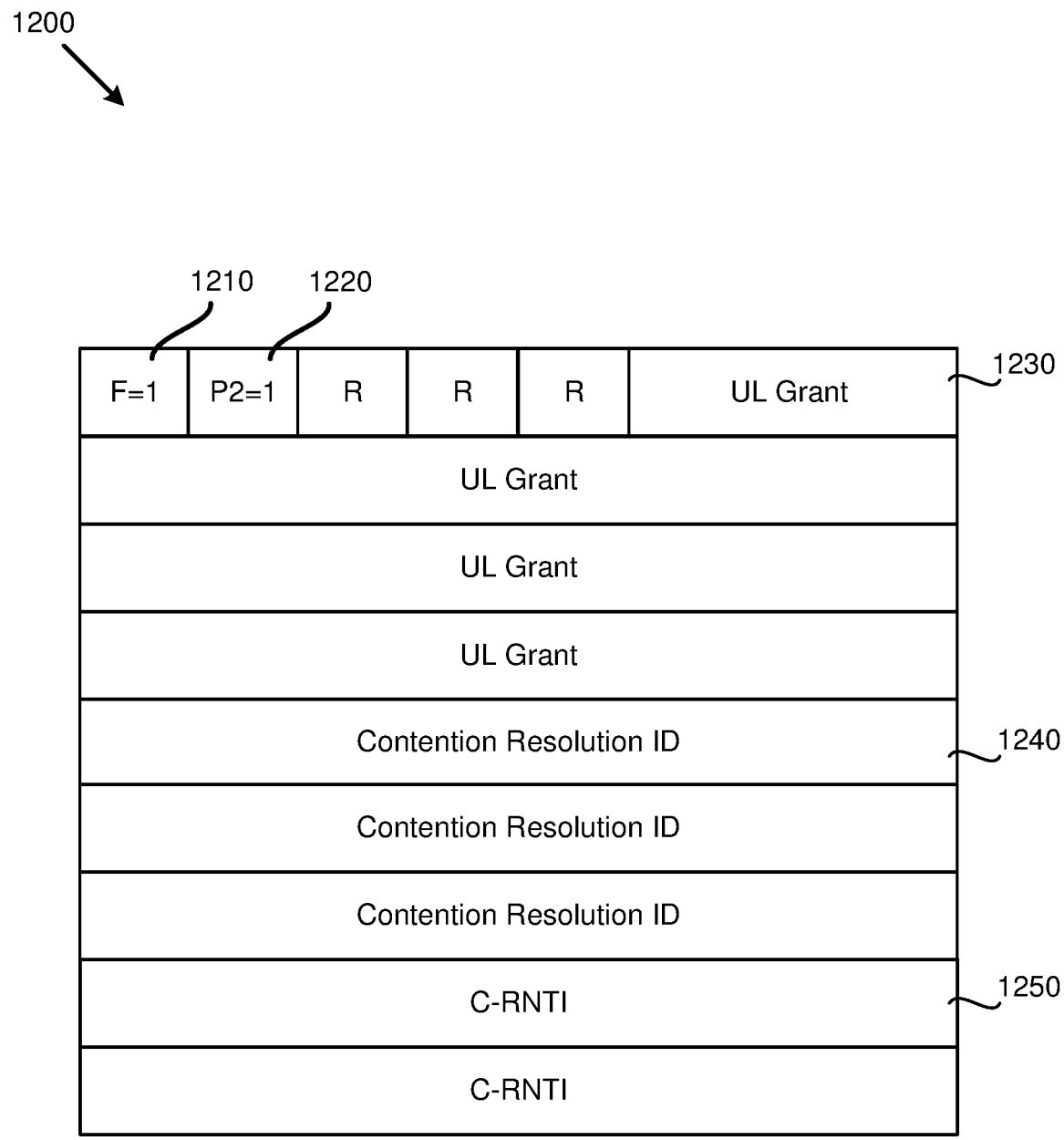
FIG. 12 is another example data structure for a MAC RAR that supports the 2-step RA procedure, according to one example implementation of the present application.

FIG. 12 is another example data structure 1200 for a MAC RAR that supports the 2-step RA procedure, according to one example implementation of the present application. As shown in FIG. 12, when the format field 1210 is set to "1" and the P2 field 1220 is set to "1", the MAC RAR 1200 may include a set of Reserved bits (e.g., three R fields in this example), an UL Grant field 1230, a Contention Resolution ID field 1240, and a C-RNTI field 1250. In some of the present implementations, the size of the Contention Resolution ID field 1240 may be 24 bits. In some of the present implementations, in order for the different MAC RAR formats to have the same size, additional Reserved bits may be added to the MAC RAR formats. For example, since the size of the MAC RAR 1200 shown in FIG. 12 is 9 octets, a set of additional 24 Reserved bits (or R fields) may be added to the MAC RAR 1300 shown in FIG. 13 in some of the present implementations. In some of the present implementations, when the format field is set to "1" and the P2 field is set to "0", the MAC RAR may include the set of Reserved bits, the Contention Resolution ID field, and the C-RNTI field, without UL grant field.

As described above, in some of the present implementations, the described 2-step RA procedure may be supported on a cell that operates on an unlicensed spectrum/frequency/channel, as well as a cell that operates on a licensed spectrum/frequency/channel. For example, a cell that operates on a licensed spectrum/frequency/channel may broadcast the parameters of the 2-step RA procedure to the UEs. In some of the present implementations, a UE may signal its capability to support the 2-step RA procedure (on a licensed or unlicensed spectrum) to the NW (for both licensed spectrum and unlicensed spectrum).

Figure 13:
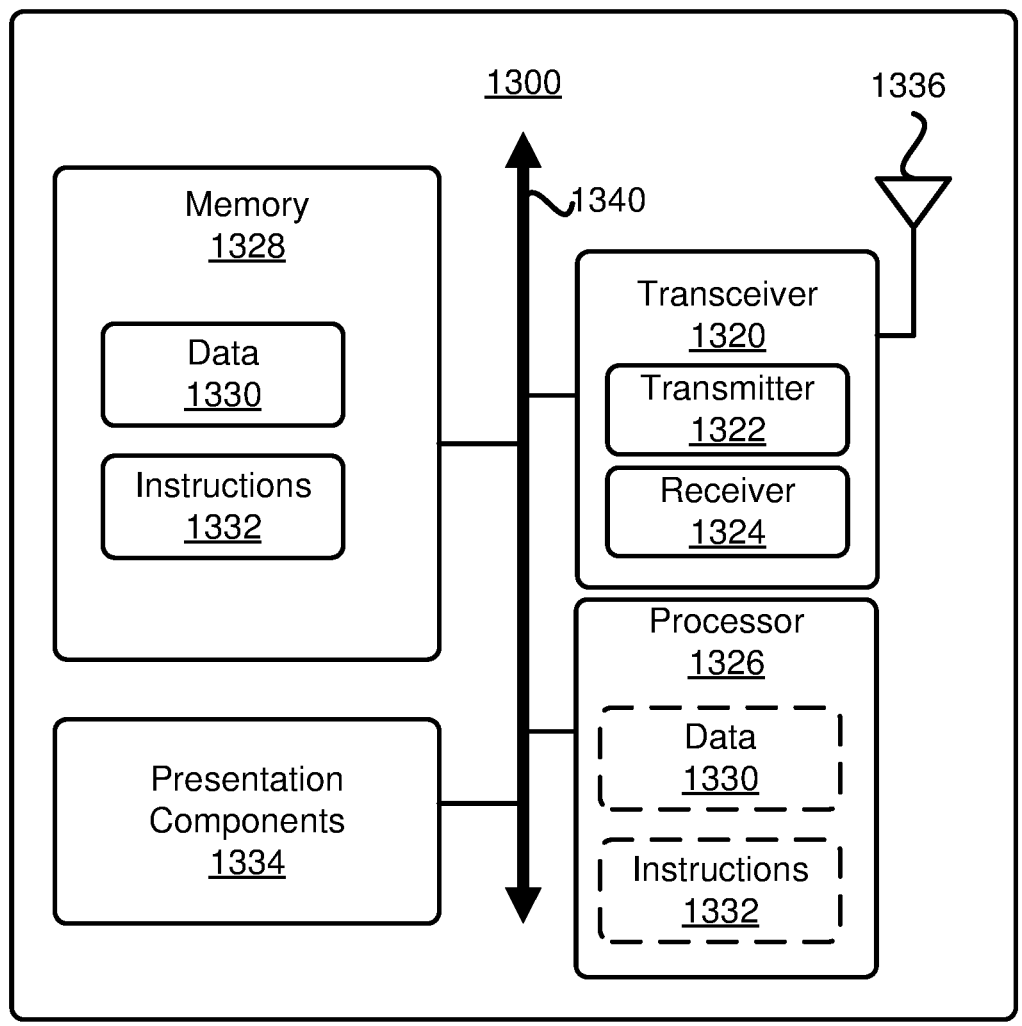
FIG. 13 illustrates a block diagram of a node for wireless communication, according to one example implementation of the present application.

FIG. 13 illustrates a block diagram of a node for wireless communication, according to one example implementation of the present application. As shown in FIG. 13, node 1300 may include transceiver 1320, processor 1326, memory 1328, one or more presentation components 1334, and at least one antenna 1336. Node 1300 may also include a Radio Frequency (RF) spectrum band module, a base station communications module, a network communications module, and a system communications management module, input/output (I/O) ports, I/O components, and power supply (not explicitly shown in FIG. 13). Each of these components may be in communication with each other, directly or indirectly, over one or more buses 1340.

Transceiver 1320 having transmitter 1322 and receiver 1324 may be configured to transmit and/or receive time and/or frequency resource partitioning information. In some implementations, transceiver 1320 may be configured to transmit in different types of subframes and slots including, but not limited to, usable, non-usable and flexibly usable subframes and slot formats. Transceiver 1320 may be configured to receive data and control signalings.

Node 1300 may include a variety of computer-readable media. Computer-readable media can be any available media that can be accessed by node 1300 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1328 may include computer-storage media in the form of volatile and/or non-volatile memory. Memory 1328 may be removable, non-removable, or a combination thereof. Exemplary memory includes solid-state memory, hard drives, optical-disc drives, and etc. As illustrated in FIG. 13, memory 1328 may store computer-readable, computer-executable instructions 1332 (e.g., software codes) that are configured to, when executed, cause processor 1326 to perform various functions described herein, for example, with reference to FIGS. 1 through 13. Alternatively, instructions 1332 may not be directly executable by processor 1326 but be configured to cause node 1300 (e.g., when compiled and executed) to perform various functions described herein.

Processor 1326 may include an intelligent hardware device, for example, a central processing unit (CPU), a microcontroller, an ASIC, and etc. Processor 1326 may include memory. Processor 1326 may process data 1330 and instructions 1332 received from memory 1328, and information through transceiver 1320, the base band communications module, and/or the network communications module. Processor 1326 may also process information to be sent to transceiver 1320 for transmission through antenna 1336, to the network communications module for transmission to a core network.

One or more presentation components 1334 presents data indications to a person or other device. For example, one or more presentation components 1334 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for performing a random access (RA) procedure, the method comprising:
   receiving, at the UE, at least one broadcast System Information Block (SIB) comprising a two-step RA configuration with a reference signal received power (RSRP) threshold, the at least one broadcast SIB further indicating whether switching from a two-step RA procedure to a four-step RA procedure is allowed;
   receiving, at the UE, a four-step RA configuration;
   determining whether a detected RSRP exceeds the RSRP threshold once the RA procedure is triggered; and
   performing the two-step RA procedure after determining that the detected RSRP exceeds the RSRP threshold by:
      transmitting a first message to a base station in a first step of the two-step RA procedure;
      determining, after transmitting the first message, whether a second message from the base station in a second step of the two-step RA procedure is received successfully based on an RA response time threshold; and
      in response to determining that the second message is received successfully and an attempt to perform a fallback four-step RA procedure in response to the second message is not successful, attempting to retransmit the first message to the base station, wherein the attempt to perform the fallback four-step RA procedure in response to the second message is determined not to be successful by:
         transmitting a third message to the base station based on fallback information received in the second message, and
         determining that a contention resolution associated with the fallback four-step RA procedure is not successful; and
      wherein attempting to retransmit the first message to the base station comprises:
         in a case that the at least one broadcast SIB indicates that switching from the two-step RA procedure to the four-step RA procedure is allowed and a first threshold number of retransmissions of the first message has been reached, switching from the two-step RA procedure to the four-step RA procedure, and
         in a case that the at least one broadcast SIB indicates that switching from the two-step RA procedure to the four-step RA procedure is not allowed and a second threshold number of retransmissions of the first message has been reached, declaring, to an upper layer of the UE, a failure of the two-step RA procedure.

2. The method of claim 1, further comprising:
   in response to determining that the second message is not received successfully, attempting to retransmit the first message to the base station.

3. The method of claim 2, wherein determining that the second message is not received successfully comprises determining that the RA response time threshold has expired while the second message is still not received.

4. The method of claim 1, wherein:
   the first message comprises a preamble and a payload, and
   the second message comprises at least one response including at least one of contention resolution information associated with the two-step RA procedure and the fallback information.

5. The method of claim 4, wherein the second message comprises a media access control (MAC) subheader of a MAC sub-Protocol Data Unit (subPDU) having at least one field, wherein the at least one field indicates whether the at least one response contains the contention resolution information associated with the two-step RA procedure for indicating a successful two-step RA procedure or the fallback information for transmitting the third message to the base station.

6. The method of claim 1, wherein the second message comprises a radio resource control (RRC) message that is a response message to an RRC procedure request indicated in the first message.

7. The method of claim 1, wherein transmitting the third message to the base station comprises transmitting the third message using an uplink grant indicated in the fallback information of the second message received from the base station.

8. A user equipment (UE) comprising:
   one or more non-transitory computer-readable media storing one or more computer-executable instructions for performing a random access (RA) procedure; and
   at least one processor coupled to the one or more non-transitory computer-readable media, and configured to execute the computer-executable instructions to cause the UE to:
      receive, at the UE, at least one broadcast System Information Block (SIB) comprising a two-step RA configuration with a reference signal received power (RSRP) threshold, the at least one broadcast SIB further indicating whether switching from a two-step RA procedure to a four-step RA procedure is allowed;
      receive, at the UE, a four-step RA configuration;
      determine whether a detected RSRP exceeds the RSRP threshold once the RA procedure is triggered; and
      perform the two-step RA procedure after determining that the detected RSRP exceeds the RSRP threshold by:
         transmitting a first message to a base station in a first step of the two-step RA procedure;
         determining, after transmitting the first message, whether a second message from the base station in a second step of the two-step RA procedure is received successfully based on an RA response time threshold; and in response to determining that the second message is received successfully and an attempt to perform a fallback four-step RA procedure in response to the second message is not successful, attempting to retransmit the first message to the base station, wherein the attempt to perform the fallback four-step RA procedure in response to the second message is determined not to be successful by:
  transmitting a third message to the base station based on fallback information received in the second message, and
  determining that a contention resolution associated with the fallback four-step RA procedure is not successful; and
wherein attempting to retransmit the first message to the base station comprises:
  in a case that the at least one broadcast SIB indicates that switching from the two-step RA procedure to the four-step RA procedure is allowed and a first threshold number of retransmissions of the first message has been reached, switching from the two-step RA procedure to the four-step RA procedure, and
  in a case that the at least one broadcast SIB indicates that switching from the two-step RA procedure to the four-step RA procedure is not allowed and a second threshold number of retransmissions of the first message has been reached, declaring, to an upper layer of the UE, a failure of the two-step RA procedure.

9. The UE of claim 8, wherein the at least one processor is further configured to execute the computer-executable instructions to cause the UE to:

in response to determining that the second message is not received successfully, attempt to retransmit the first message to the base station.

10. The UE of claim 9, wherein determining that the second message is not received successfully comprises determining that the RA response time threshold has expired while the second message is still not received.

11. The UE of claim 8, wherein:
the first message comprises a preamble and a payload, and
the second message comprises at least one response including at least one of contention resolution information associated with the two-step RA procedure and the fallback information.

12. The UE of claim 11, wherein the second message comprises a media access control (MAC) subheader of a MAC sub-Protocol Data Unit (subPDU) having at least one field, wherein the at least one field indicates whether the at least one response contains the contention resolution information associated with the two-step RA procedure for indicating a successful two-step RA procedure or the fallback information for transmitting the third message to the base station.

13. The UE of claim 8, wherein the second message comprises a radio resource control (RRC) message that is a response message to an RRC procedure request indicated in the first message.

14. The UE of claim 8, wherein transmitting the third message to the base station comprises transmitting the third message using an uplink grant indicated in the fallback information of the second message received from the base station.

* * * * *